US007116906B2

(12) United States Patent
Volpi et al.

(10) Patent No.: US 7,116,906 B2
(45) Date of Patent: Oct. 3, 2006

(54) WIRELESS OPTICAL SYSTEM FOR HIGH BANDWIDTH COMMUNICATIONS

(75) Inventors: John P. Volpi, Garland, TX (US); Steven D. Roemerman, Highland Village, TX (US); Matthew N. Bowers, Dallas, TX (US)

(73) Assignee: Incucomm, Inc., Plano, TX (US)

( * ) Notice: Subject to any disclaimer, the term of this patent is extended or adjusted under 35 U.S.C. 154(b) by 588 days.

(21) Appl. No.: 10/090,249

(22) Filed: Mar. 4, 2002

(65) Prior Publication Data

US 2002/0126338 A1    Sep. 12, 2002

Related U.S. Application Data

(60) Provisional application No. 60/273,873, filed on Mar. 6, 2001.

(51) Int. Cl.
*H04J 14/00* (2006.01)

(52) U.S. Cl. ............... 398/77; 398/76; 398/96; 398/103; 375/259; 375/298

(58) Field of Classification Search ............ 398/23–27, 398/76–77, 96, 103, 119–131; 375/259, 375/298, 316
See application file for complete search history.

(56) References Cited

U.S. PATENT DOCUMENTS

| | | | |
|---|---|---|---|
| 5,142,400 A | 8/1992 | Solinsky | |
| 5,149,949 A | 9/1992 | Wike, Jr. | |
| 5,282,222 A | 1/1994 | Fattouche et al. | |
| 5,577,026 A | 11/1996 | Gordon et al. | |
| 5,627,669 A | 5/1997 | Orino et al. | |
| 5,648,862 A | 7/1997 | Owen | |
| 5,677,909 A | 10/1997 | Heide et al. | |
| 5,774,247 A | 6/1998 | Taglione et al. | |
| 6,249,543 B1* | 6/2001 | Chow | 375/219 |
| 6,348,986 B1 | 2/2002 | Doucet et al. | |
| 6,381,055 B1 | 4/2002 | Javitt et al. | |
| 6,559,994 B1* | 5/2003 | Chen et al. | 398/182 |
| 6,577,598 B1* | 6/2003 | Hwang et al. | 370/208 |
| 6,609,039 B1* | 8/2003 | Schoen | 700/94 |
| 6,611,551 B1* | 8/2003 | Jones et al. | 375/219 |
| 6,754,170 B1* | 6/2004 | Ward | 370/208 |

FOREIGN PATENT DOCUMENTS

WO    WO 91/09477 A    6/1991

OTHER PUBLICATIONS

Nakata et al., "In-House Wireless Communication System Using Infrared Radiation", New World of the Information Society. Sidney, Australia Oct. 30, 1984 through Nov. 2, 1984, International Conference on Computer Communication, Amsterdam North-Holland, NL, Volume Conference 7, 1985, pp. 333-338.
OMNILUX, The Omnilux Solution, 2002, 7 pages, Pasadena, CA 91103.
Omnilux, The Most Cost Effective Solution for Last-Mile Access, Omnilux Sytem Overview, Key Benefits, Sep. 30, 2002, 6 pages, Pasadena, CA 91103.

* cited by examiner

*Primary Examiner*—Dzung Tran
(74) *Attorney, Agent, or Firm*—Haynes and Boone, LLP

(57) ABSTRACT

A method for communicating information includes modulating a communications signal by orthogonal frequency domain modulation and transmitting the communication signal by a laser and/or light emitting diode carrier signal.

20 Claims, 17 Drawing Sheets

WIRELESS OPTICAL SYSTEM FOR HIGH BANDWIDTH COMMUNICATIONS

CROSS-REFERENCE

This application claims the benefit of U.S. Provisional Patent Application Ser. No. 60/273,873 filed on Mar. 6, 2001. This application is also related to U.S. application Ser. No. 10/090,270, entitled WIRELESS OPTICAL SYSTEM FOR MULTIDIRECTIONAL HIGH BANDWIDTH COMMUNICATIONS, filed on Mar. 4, 2002. The aforementioned applications are commonly assigned with the present invention and are incorporated herein by reference.

FIELD OF INVENTION

The present invention pertains to electronic communication systems. More specifically, the systems are those that use very high data bandwidths, require very high Quality of Service (QoS) and/or transmit over significant distances greater than 5 kilometers.

BACKGROUND

It is common knowledge that signals can be imposed upon laser light and LEDs by various means of modulation. It is also common knowledge that the atmosphere does not possess a uniform transmittance. Two classes of phenomenon primarily cause this. The first relates to the general chemical composition of the atmosphere and consists of bands of alternating high and low transmittance as a function of carrier frequency. These are well understood and generally well behaved. Thus, one can design a class of communication lasers and/or LEDs that will take advantage of higher transmittance within a particular frequency band as opposed to adjacent bands and expect the resulting system to perform significantly better than a system that does not do so. The second phenomenon is unfortunately not as well behaved and deals with the fact that the atmosphere is not homogeneous and constant in space and in time. Due to environmental conditions such as temperature gradients, moisture content, pollutants, wind and turbulence, the atmosphere's transmittance and index of refraction changes in localized spaces. These conditions are cumulative with distance, time varying, and are generally not predictable. Therefore they are best thought of in terms of random variables and consequently systems that do not compensate for them suffer in performance and quality. The result is that the channel, though it is pure line-of-sight, is an extremely hostile channel and optical systems (i.e. laser-and/or LED based) typically are only used for short distances where the cumulative atmospheric uncertainty is small. These systems typically can only establish reliable communication channels at data levels and ranges well below what might be expected for pure line-of-sight conditions. Typical means used in an attempt to overcome these obstacles include significantly increasing the output power of the transmitter laser or LED by either pure transmit power and also by the inclusion of expensive and physically large optics in the receiver configurations. While improving performance somewhat, these measures also have substantial negative impact. Higher power lasers are substantially higher in cost and also possess a health hazard to individuals in close proximity, either willingly, or unwillingly. Additionally, these higher power units also may possess a negative environmental impact Further, the cost of optical systems can go as the square of the size of the lenses employed, so it is easy to see the impact of a hostile channel on both cost and performance.

Even though some more recent systems have attempted to use other techniques such as some spatial diversity, positive results have been limited and the requirement to still use the items discussed above is not much alleviated.

SUMMARY

Accordingly, a need has arisen for an improved method and system for high bandwidth communications utilizing free space or wireless optics. The present invention provides a method and system for high bandwidth communications utilizing free space or wireless optics that addresses the shortcomings and disadvantages of prior methods and systems by employing orthogonal modulation means to optical communication signals.

Different aspects of the present invention may provide numerous technical advantages including significant improvements in the quality of the system consisting of the transmitter and the receiver. This can result in significant reductions in laser and/or LED power needed to effectively provide a high quality communication link. The reduction in power reduces and in some cases can completely eliminate all potential hazards of using laser power at dangerous levels. Another advantage is to reduce or eliminate the need for expensive and often large optics at the receiver. All that is needed in many cases is a small collimated beam from the transmitter and inexpensive small optics at the receiver.

Orthogonal Frequency Domain Modulation ("OFDM") is made up of multiple narrowband signals, each orthogonal with one another. By appropriate transformation, the original signal can be transformed into a set of these orthogonal narrowband signals. The number of orthogonal narrowband signals can be arbitrarily large, ultimately determined only by the specific application and the technological capability available and the cost allocated to generate them at that time. Further, because OFDM is a computationally intensive operation, devices such as digital signal processors (DSPs) and computer processing units (CPUs) are commonly used. Therefore it should be expected that the cost advantage of these systems will only improve due to the beneficial effects and large influence of Moore's Law on such systems.

Because OFDM has the property of generating signals that are independent of each other, any narrowband signal attenuation or narrowband signal interference impinging on the overall signal will only affect those portions of the orthogonal signals where the narrowband interference and/or attenuation specifically occurs and will not affect at all the other orthogonal narrowband signals making up the original signal. This is in contrast to the commonly observed situation now prevalent with present laser and LED communication systems where the entire original signal will be effected and corrupted, potentially beyond repair even if only narrowband portions of it are effected and corrupted by interference and/or attenuation. Therefore, if these corrupting conditions were the same and the original signal was converted into an OFDM signal, conventional error detecting techniques could be used to identify those specific narrowband signals that were corrupted. Then, by means of error correcting techniques, the original signal could be fully reconstructed. Therefore, the system permits a much higher level of signal quality in hostile conditions than is presently available with existing laser and LED communications systems. Note that the means to quality improvement is not done here by making the signal stronger and potentially hazardous, as is done in conventional systems, nor is it done by adding expensive optics as is also prevalent, but by constructing the signal in a novel and unique manner that renders it much less susceptible to the hostile transmittance characteristics of the atmosphere.

According to another embodiment OFDM is deployed in combination with spatial diversity techniques in order to enhance reliable transmission through a hostile optical channel.

Yet another embodiment is to have OFDM combined with multi-carrier ("multicolor") lasers and LEDs along with spatial diversity to create a system that is highly resistant to signal scintillation and fading.

Other technical advantages are readily apparent to one skilled in the art from the following figures, descriptions, and claims.

BRIEF DESCRIPTION OF THE FIGURES

For a more complete understanding of the present invention and the advantages thereof, reference is now made to the following descriptions taken in connection with the accompanying drawings, and which.

DETAILED DESCRIPTION

Embodiments of the invention and its advantages are best understood by referring to FIGS. 1 through 5 of the drawings.

A protocol independent wideband communication system is described that consists of optical laser or LED transmitters and receivers. A unique feature of this system is the combination of digital processing and network management that minimizes the effects of the hostile optical channel. This results in the ability to reliably and cost effectively provide performance at levels closer to theoretical limits. The system can be used in several configurations.

Figure 1A:
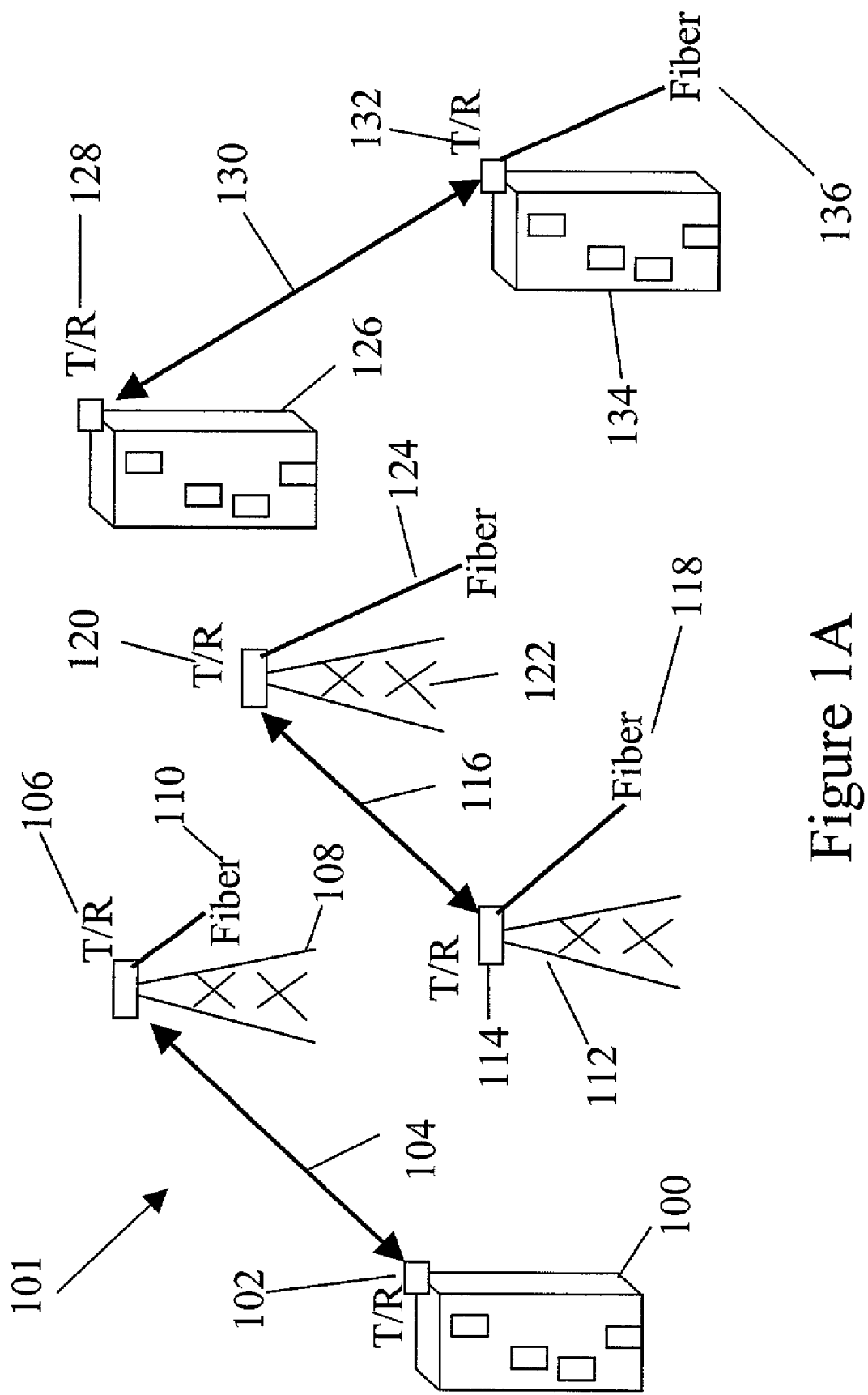
FIG. 1A illustrates an exemplary point-to-point communication system configuration for wireless high bandwidth optical communications where communication is accomplished between two points by pairs of transmitter/receivers ("T/Rs").
Figure 1B:
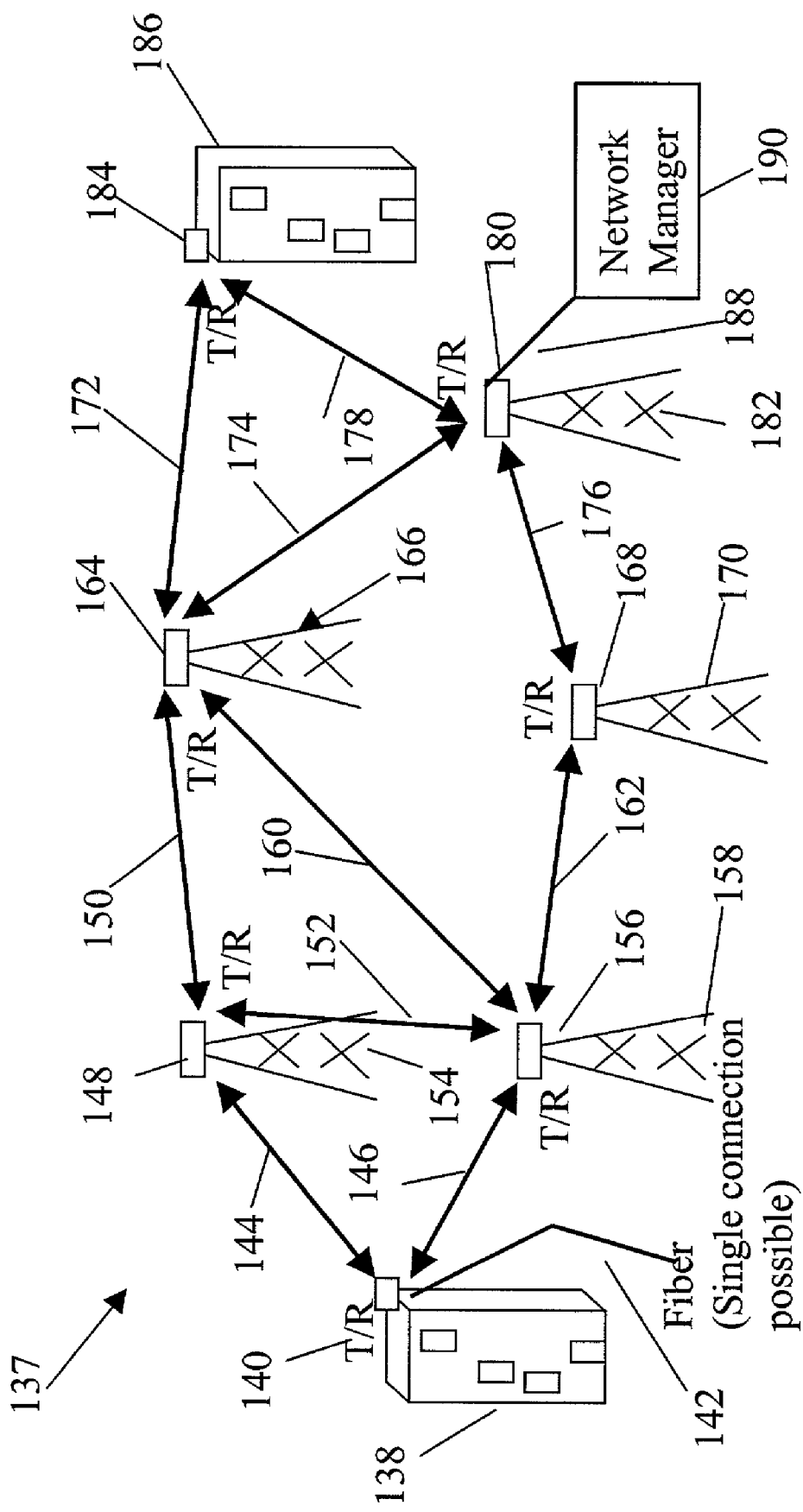
FIG. 1B illustrates an exemplary peer-to-peer communication system for wireless high bandwidth optical communications where communications is accomplished among a set of many T/R units, each unit at multiple locations.

FIGS. 1A and 1B are a pair of schematic drawings illustrating two potential configurations for use of the present invention: Point-to-Point and Peer-to-Peer.

FIG. 1A illustrates a point-to-point configuration 101 shows multiple pairs of transmitter and receiver systems configured in pairs, each pair completing a 2 way optical communication link. Specifically, a structure 100 is coupled to a transmitter/receiver system (T/R) 102 for providing one half of a two way link 104 to a T/R 106 at a tower site 108. The continuing communication link then is satisfied by a fiber 110. The figure further shows a T/R 114 affixed to a tower 112 from which a communication link shown by fiber 118 exists. The T/R 114 providing one half of a link 116 to another tower 122 to which is attached the second T/R system 120 of this point-to-point pair. The continuing common communication link is satisfied by fiber 124. Additionally, the figure illustrates a structure 126 to which is coupled to a T/R system 128 comprising one half of a point-to-point pair. The T/R system 128 is capable of creating a link 130 to the T/R system 132, which is the second half of the point-to-point pair coupled to structure 134 where the continuing part of the communication link is illustrated by fiber 136. Those skilled in the art can see that the structures shown in this figure can represent any structure and the towers shown can represent any tower. Additionally, those skilled in the art can readily see that those continuations of the communication link, here represented by fiber can be extended to be any type of communication link such as cable, microwave or additional optical links.

FIG. 1B illustrates a peer-to-peer configuration 137, which shows an optical communications system configured in a peer-to-peer architecture. Here structures 138 and 186 as well as towers 154, 158, 166, 170, and 182 all have T/R systems 140, 148, 156, 164, 168, 180, and 184 coupled to them. Then in a peer-to-peer manner, multiple possibilities of communication links can be established. These links are illustrated by arrows 144, 146, 150, 152, 160, 162, 172, 174, 176, and 178. These links are not meant to be exhaustive of all possible links, but are to illustrate that multiple options, including redundant links, are possible. The specific links between T/R stations can change in real time, and are controlled and monitored by a network manager 190 through a link 188. The fiber link 142 is illustrative of a means to connect this communications system to other networks and is not meant to show that this is the only way this system can be connected. Other types of links such as those using cable, microwave, or optical means are well known to those in the art and are assumed here.

The network manager 190 defines optimum paths from all possible links. Also note that a ring configuration has been shown in the links 144, 150, 172, 178, 176, 162, and 146. Thus, an application of one embodiment of this invention could be used as an adjunct to a fiber ring for enhanced overall network reliability. Because the wireless optical ring uses different technology and a different transmission medium than a conventional fiber ring, the probability that both rings would simultaneously fail is much less (i.e. the product of each failing individually). Therefore, a network that deployed both systems, each backing up the other, would result in a highly reliable system. In addition, when both the fiber and optical systems are operational, each can carry independent communications traffic thus increasing the system's typical capacity even further.

Some present networks are cost constrained, not by the basic hardware cost, but by the cost of backhaul (e.g. picocells in a mobile communications network). For this reason, the peer-to-peer configuration is particularly interesting as it provides an efficient and low cost means for backhaul to a single point thus avoiding the considerable cost of point-to-point backhaul common in many fixed and mobile systems while at the same time also providing redundant paths for an increased reliability system. The links shown here are only examples and not meant to be comprehensive of all possibilities. Other possible network configurations are also possible and can be derived from these two basic configurations.

The basic architecture for the transmitter and receiver is the use of orthogonal multiplexing and diversity techniques to provide reliable and cost effective transmission through a hostile optical channel. For example, Orthogonal Frequency Domain Modulation ("OFDM") combined with multi-carrier ("multi-color") lasers and LEDs along with spatial diversity creates a system that is highly resistant to signal scintillation and fading. OFDM has been discussed at length in the literature with respect to conventional RF signals and its ability to maintain signal integrity in a hostile RF channel, primarily corrupted by multipath, has been well documented. OFDM is explained in *OFDM for Wireless Multimedia Communications* (Van Nee and Prasad, 2000) and in an application in a U.S. Pat. No. 5,282,222 to Fattouche, et. al., which is hereby incorporated by reference. However, the literature restricts the use of OFDM to radio frequency applications. One aspect of the present invention uses OFDM techniques in optical networks, allowing greater spatial diversity, frequency diversity, and signal repair techniques of optical signals. Spatial diversity is based on the fact that a significant number of wavelengths of separation between two or more signal sources renders them statistically independent from the channel through which they propagate. For optical systems, this need only range from a few to several centimeters to satisfy this requirement.

The same physical phenomenon can be extended to frequency diversity where the time varying nature of the hostile optical channel may render the transmittance at one frequency more desirable than another in a transient non-stationary sense. Then a system which is capable of monitoring the temporal, frequency dependent characteristics of the optical channel and mitigating those changes by being able to send data simultaneously across multiple frequencies and/or select the best frequencies upon which to transmit in a dynamic manner is performing a type of frequency diversity.

FIGS. 2A–2D are schematic drawings showing four possible configurations of the transmitter which could be used in the embodiment of FIG. 1.

Figure 2A:
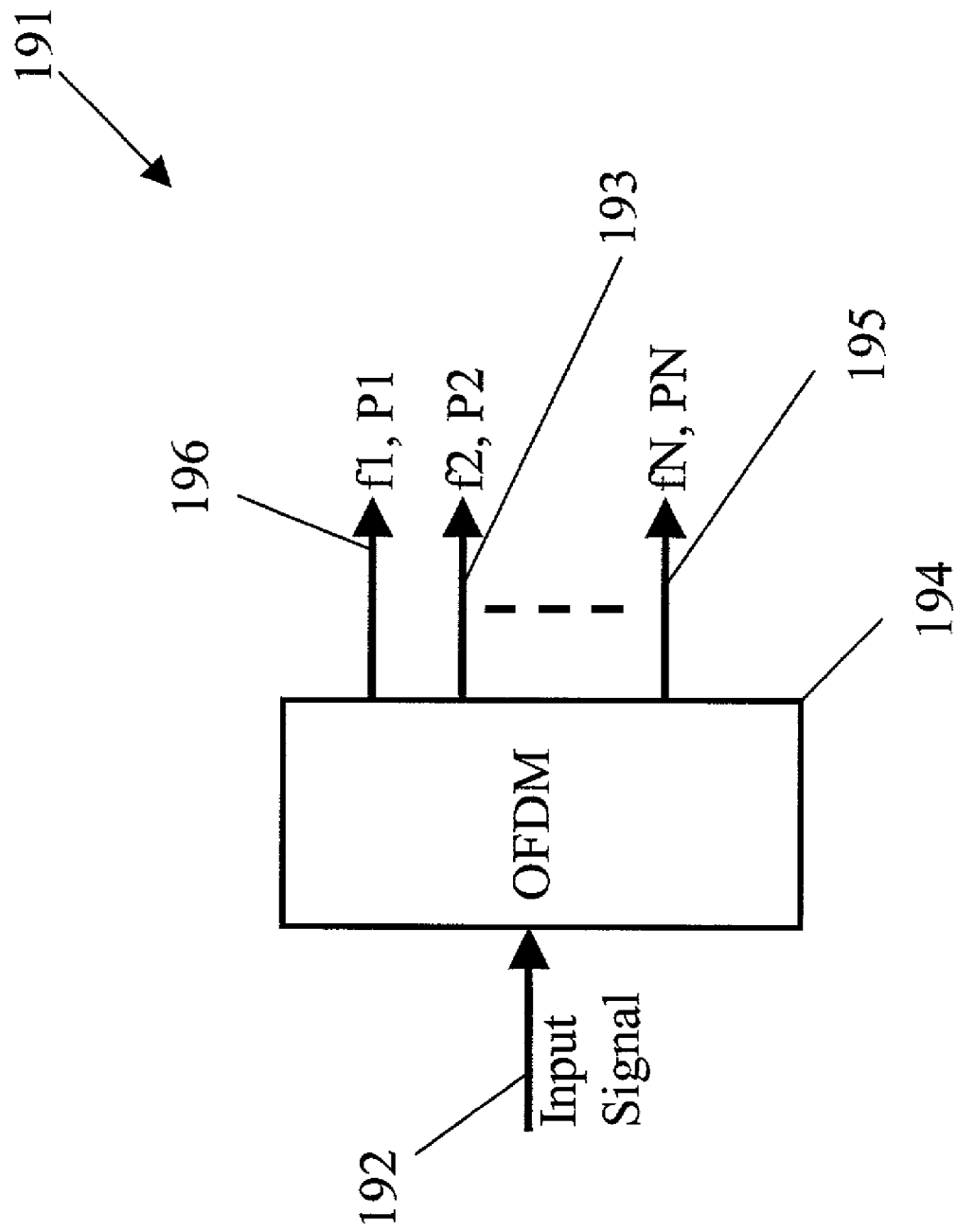
FIG. 2A illustrates an exemplary embodiment of a multi-carrier transmitter with spatial diversity.

FIG. 2A illustrates an embodiment described as Configuration A 191, a multi-carrier transmitter with spatial diversity. It adapted to receive a signal 192 as input to an M-Point OFDM modulator 194. The outputs 196 193 and 195 consist of N lasers and/or LEDs, each at a specific frequency shown here as frequency f1, f2, through fn. Each laser and/or LED is at a specific location here designated by P1, P2, through PN. This means that if there are N different lasers and/or LEDs and the OFDM modulator generated an M-Point OFDM signal consisting of M orthogonal narrow band signals, then each laser and/or LED will transmit M/N of the narrowband signals.

Figure 2B:
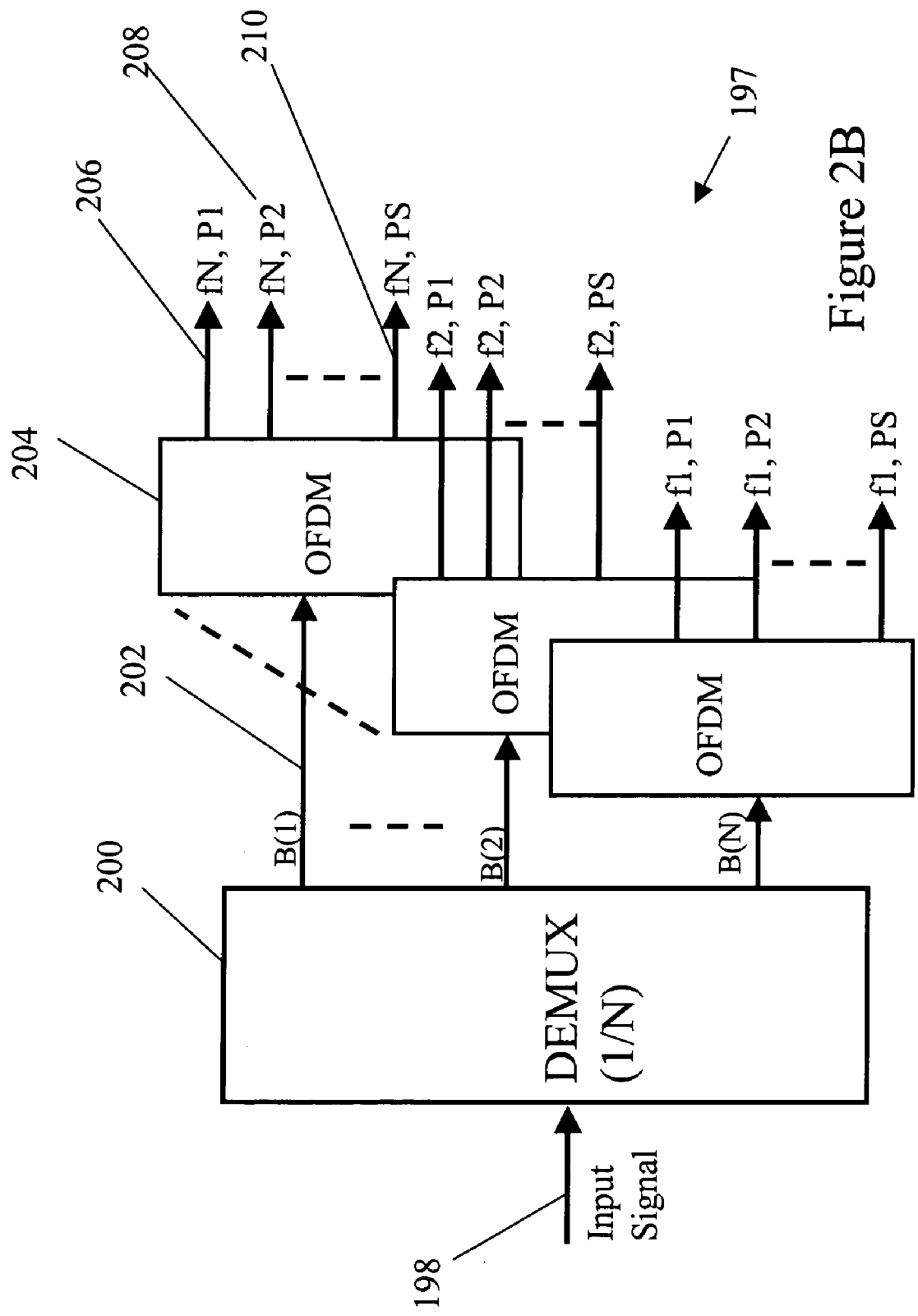
FIG. 2B illustrates an exemplary embodiment of a multi carrier with spatial diversity where the signal is first divided into parts prior to orthogonalization.

FIG. 2B illustrates an embodiment described as Configuration B 197, a multi-carrier with spatial diversity where the signal is first divided into parts prior to orthogonalization. It consists of a signal 198 which is input into a 1/N multiplexer 200. The multiplexer generates N outputs 202 where each output consists of 1/N of the entire signal. This is prior to orthogonalization and may, for example, be performed by taking each bit as it is input and sequentially directing it to an output. Therefore, for this case, each output would consist of a unique bit stream composed of every Nth bit of the entire signal, offset by 1. So the first output of the multiplexer would be bit 1 of the input signal followed by bit N+1, 2N+1 and so forth. In the same manner, the second output would start with bit 2 followed by Bit N+2, 2N+2 and so forth until the last output of the multiplexer whose first bit would be N followed by N+N, 2N+N, and so forth until all bits of the input signal are distributed to the inputs of the N OFDM Modulators 204.

Each of the N Modulators individually generates an orthogonal series of M narrowband signals illustrated for the topmost modulator in the figure and for this embodiment as 206, 208, and 210. The output signals are all at the same specific frequency fN for each OFDM modulator, that is they are at the same carrier frequency. However, they are spatially separated to S unique positions. Each laser and/or LED is at a specific location here designated by P1, P2, through PS. This group of lasers and/or LEDs forms a station of transmitting elements at a single transmitter site. Each output laser and/or LED will therefore transmit M/S of the narrowband signals. In the same manner, the remaining (N−1) OFDM modulators also each generate S outputs, each at the same carrier frequency assigned to that OFDM modulator with each laser and/or LED spatially separated.

Figure 2C:
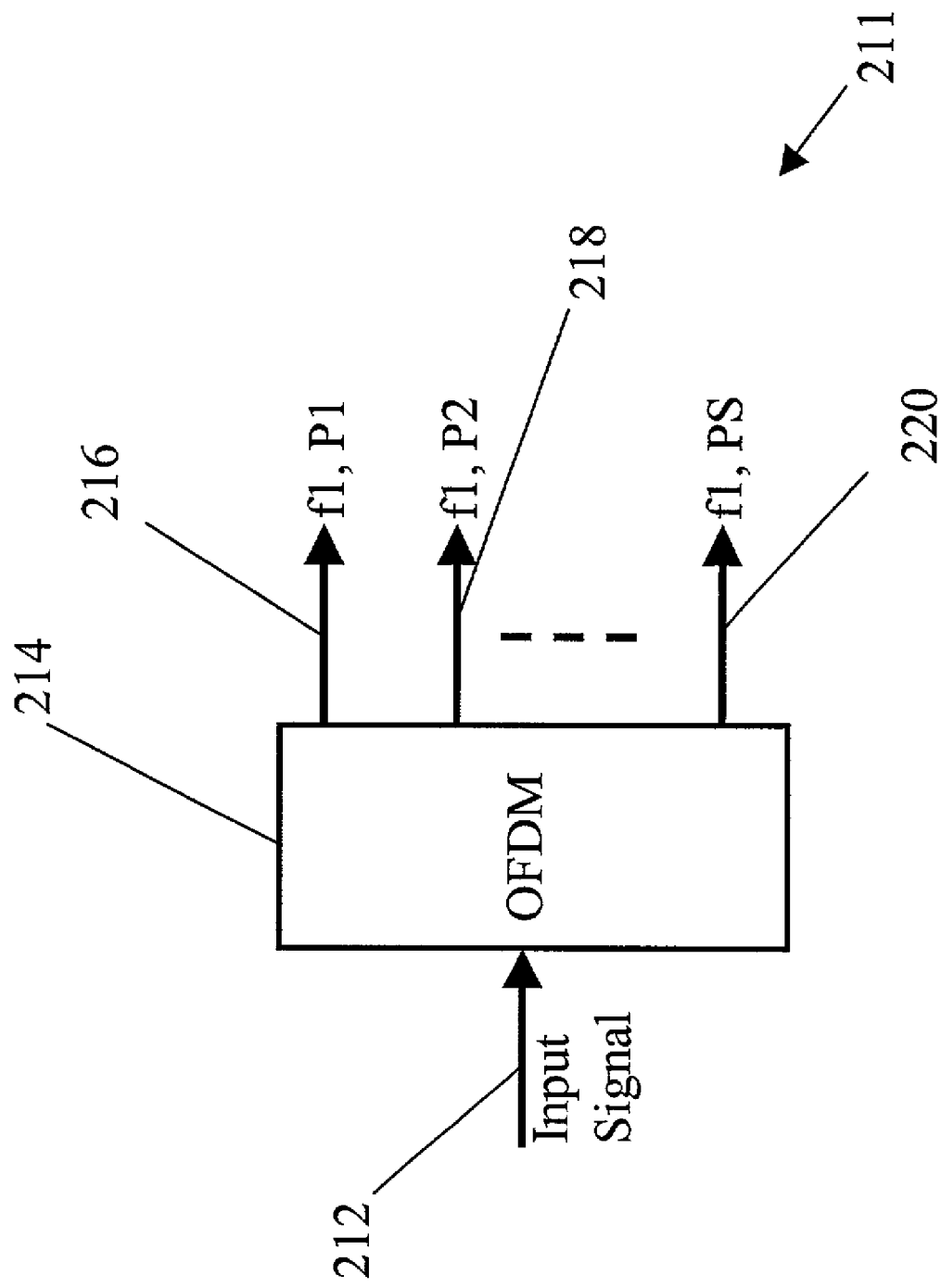
FIG. 2C illustrates an exemplary embodiment of a single carrier transmitter with spatial diversity.

FIG. 2C illustrates an embodiment described as Configuration C 211, a single carrier transmitter with spatial diversity. It consists of the signal 212 input to an M-Point OFDM modulator 214. The outputs 216, 218, and 220 consist of S lasers and/or LEDs, each at the same carrier frequency shown here as frequency f1. Each laser and/or LED is at a specific location here designated by P1, P2, through PS forming a station. This group of lasers and/or LEDs forms a station of transmitting elements at a single transmitter site. This means that if there are S different lasers and/or LEDs and the OFDM modulator generated an M-Point OFDM signal consisting of M orthogonal narrow band signals, then each laser and/or LED will transmit M/S of the narrowband signals.

Figure 2D:
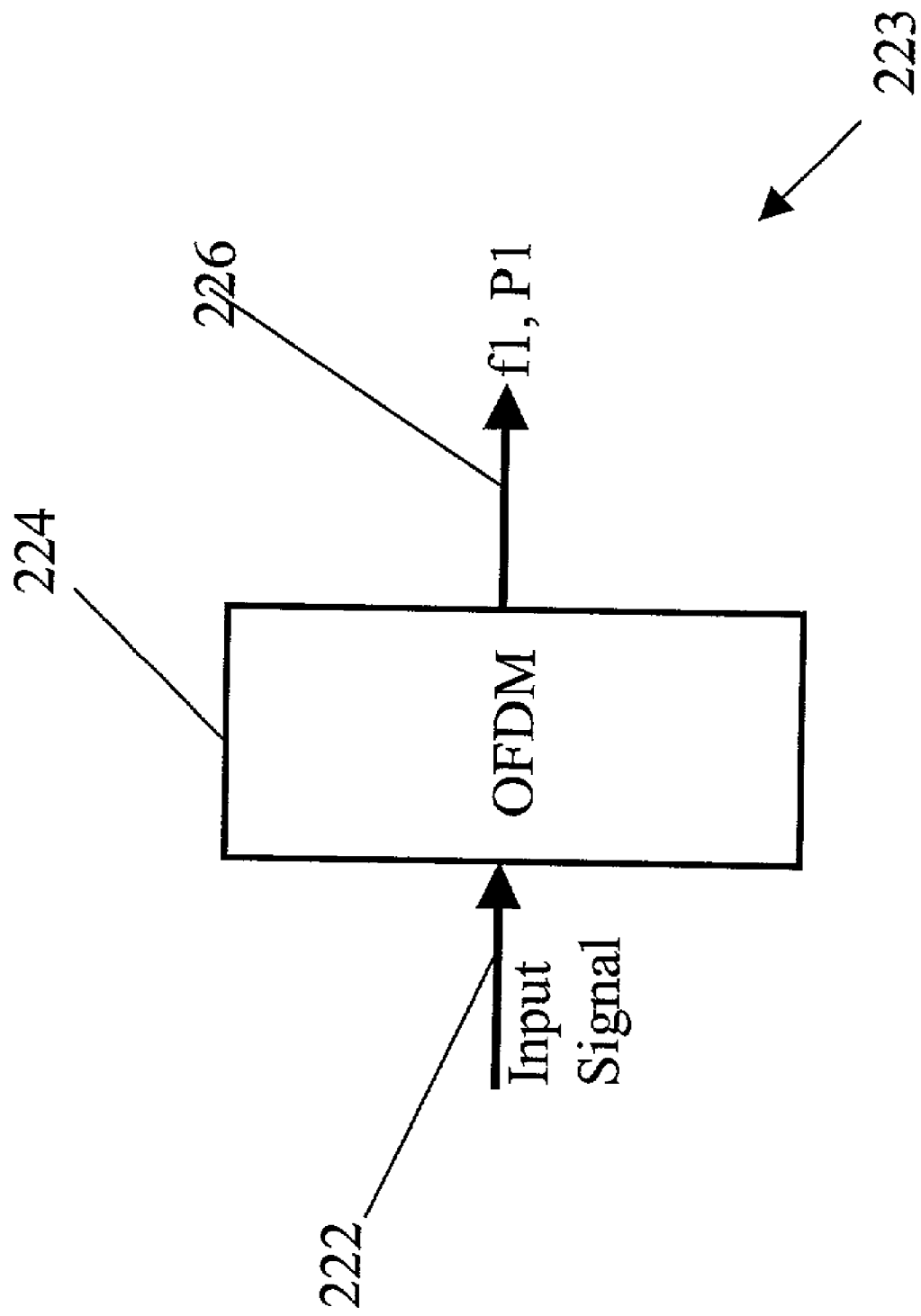
FIG. 2D illustrates an exemplary embodiment of a single carrier and single Laser and/or LED transmitter.

FIG. 2D illustrates an embodiment described as Configuration D 223, which is a single carrier and single Laser and/or LED transmitter. It consists of the signal 222 input to an M-Point OFDM modulator 224. The outputs 226 is a single laser and/or LED specified at a specific carrier frequency shown here as frequency f1. The laser and/or LED is at a specific location here designated by P1. Since there is only a single OFDM modulator and a single output, this means that that the entire orthogonalized signal consisting of all the narrowband carriers are transmitted by this single element.

Figure 3:
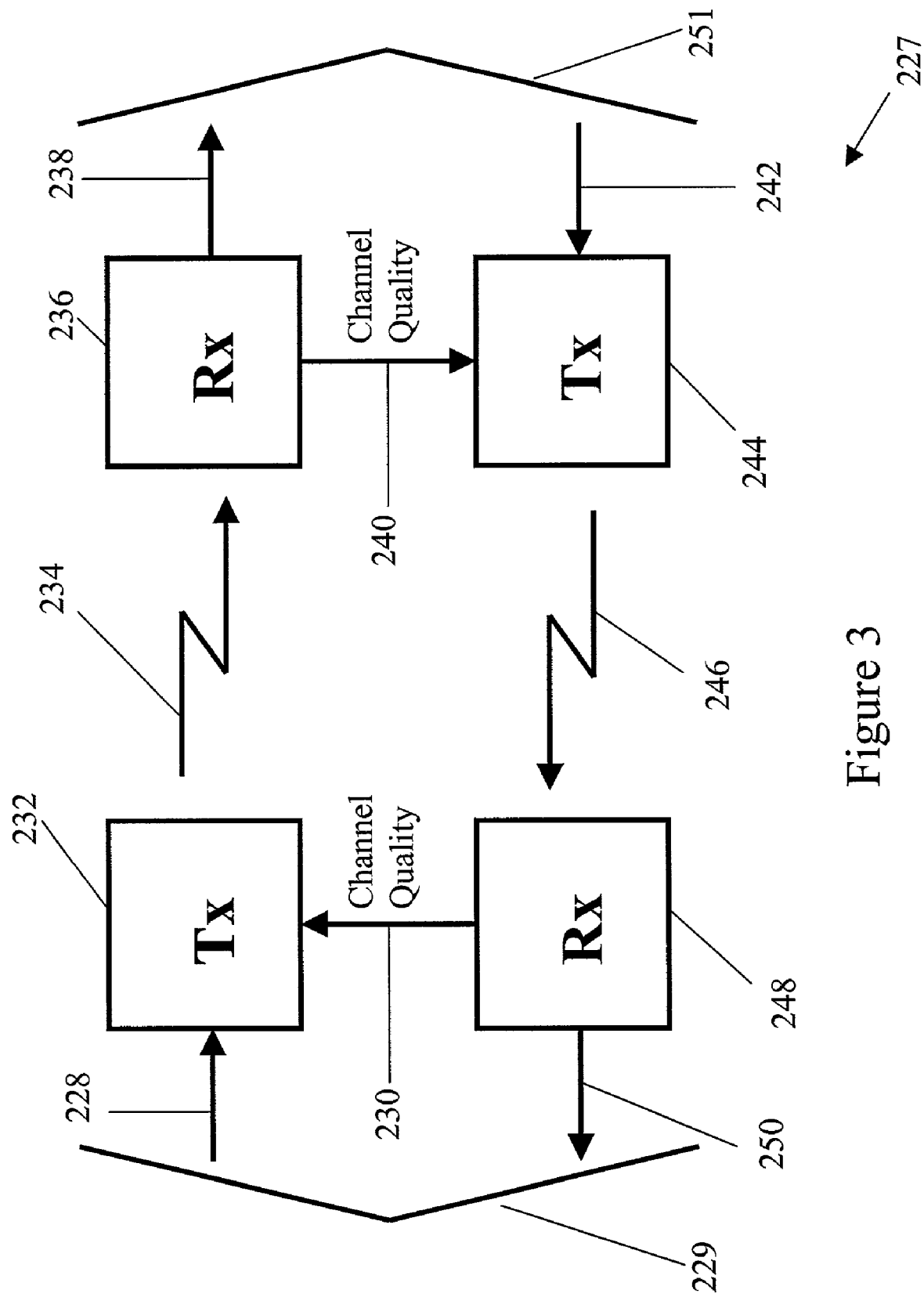
FIG. 3 is a block diagram of a transceiver according to one aspect of the present invention.

FIG. 3 is a block diagram of a transceiver 227 according to the teachings of the invention. It consists of protocol independent digital input signals 229 and 251 composed of transmitter input signals 228 and 242 and receiver output signals 238 and 250. The transmitter inputs are to transmitters 232 and 244 respectively. Each transmitter generates an output signal 234 and 246 respectively, which is received by the receivers 236 and 248 respectively. In addition, each receiver generates a unique channel quality signal 230 and 240 respectively, which is input to the transmitter making up the Transmitter Receiver pair or Transceiver.

Any of the four configurations discussed above: Configuration A 191, Configuration B 197, Configuration C 211 and Configuration D 223 can be realized as embodiments of transceiver 227

Configuration C 211 employs OFDM in a conventional manner along with spatial diversity while Configuration B 197 has the most degrees of freedom as it employs both multi-carrier and spatial diversity. This permits the system, using channel quality, to monitor and select the frequencies with highest transmittance on a real time basis for highest performance. Configuration B 197 may also be used to substantially increase the maximum data rate transfer (N times) when a channel is benign by converting it to 'N' sets of Configuration C 211. The degree to which this is possible is dictated by the Channel Quality Signal 230 and 240. Based on known transmitted pilot tones, a Carrier/Noise and Bit Error Rate (BER) estimate is generated, which drives the power levels of the transmit lasers as well as providing the basis for whether or not the channel is sufficiently benign to allow the factor of 'N', or some submultiple of N, increase in data rate. It is expected that for a majority of the time, this data rate multiplication feature can be employed. Alternatively, should a situation arise where the desired BER cannot be achieved even when Configuration B is fully deployed and the quality indicators have driven the optical transmitters to maximum power, then the system shall have the capability to reduce data rates until the desired BER is achieved.

Configuration A 191 approaches the integrity of Configuration B 197 with much less hardware. However, it is not capable of achieving 'N' times the data rate in a benign environment.

Configuration D 223 is a reduced form of Configuration C. It is an OFDM modulated laser and/or LED without spatial diversity. However, this novel configuration can still significantly enhance signal integrity in 2 ways. It uses OFDM and, like the other configurations, also applies forward error correcting ("FEC") codes. A likely application for this low cost version is for relatively short outdoor transmissions as well as high bandwidth indoor applications.

FIGS. 4A–4D are block diagrams of eight possible embodiments of a transmitter according to the teachings of this invention showing additional detail. Here the training symbols and pilot tones for determining channel quality and obtaining synchronization are noted. Also noted is an inverse fast Fourier transform ("IFFT") that is an example of the means to realize an OFDM modulator. Other methods are possible and this implementation is not meant to mean that this is the only, or required, approach. In this case, the optimum number of points of this IFFT shall typically be determined by the maximum data rate required and the maximum range for a specified BER.

Forward error correcting (FEC) codes may also be are applied. Convolutional and/or turbo codes, as opposed to block codes, (e.g. Hamming Codes) may be preferred due to the high data rates and the ability of these techniques to successfully recover signals in poor signal conditions. Such error coding is often used in digital communication systems to protect the digital information from noise and interference and reduce the number of bit errors. Error coding is mostly accomplished by selectively introducing redundant bits into the transmitted information stream. These additional bits will allow detection and correction of bit errors in the received data stream and provide more reliable information transmission. The cost of using error coding to protect the information is a reduction in data rate or an expansion in bandwidth. As those skilled in the art will appreciate, there are two main types of error codes, namely block codes and convolutional codes. Block codes are based rigorously on finite field arithmetic and abstract algebra. They can be used to either detect or correct errors. Convolutional codes, on the other hand, convert the entire data stream into one single codeword. The encoded bits depend not only on the current input bits but also on past input bits. The main decoding strategy for convolutional codes is based on the widely used Viterbi algorithm. Another correcting code is a turbo code, which is a near channel capacity error correcting code. This error correcting code is able to transmit information across the channel with arbitrary low (approaching zero) bit error rate. Turbo code is a parallel concatenation of two component convolutional codes separated by a random interleaver, which allows it to achieve greater capacity that ordinary convolutional codes.

The illustrated configurations may have the FEC codes are added both prior and post orthogonalization. Corrections can be individually applied to each of the M individual components of the signal and also allows the processing to occur at a rate of 1/M of the actual data rate thus permitting less expensive computational hardware to be successfully used to realize this invention. This is then used in conjunction with network management functions 190 to obtain maximum quality of service possible for these conditions.

Figure 4A:
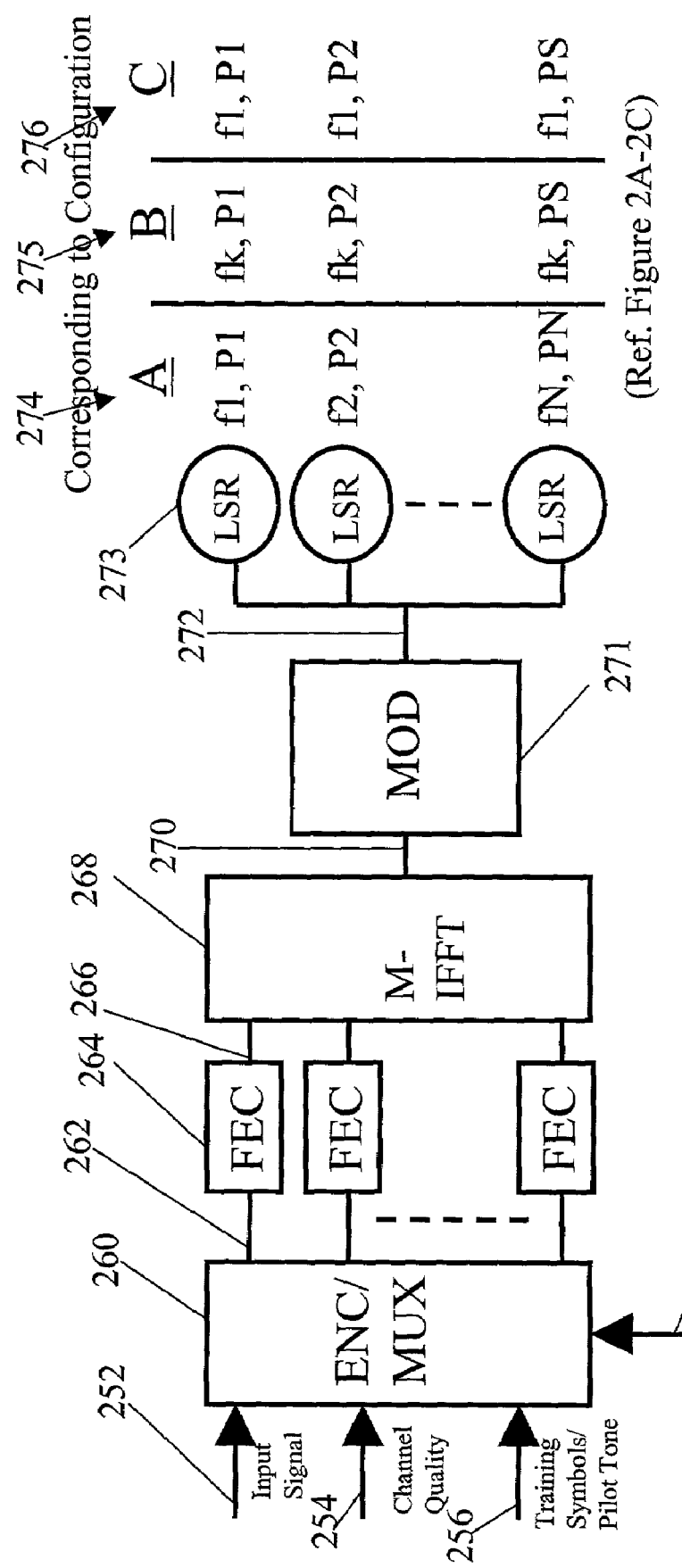
FIG. 4A illustrates an exemplary transmitter used in one aspect of the present invention for configurations where forward error correction is applied prior to orthogonalization.

FIG. 4A is an embodiment of the transmitter whereby forward error correction (FEC) is applied prior to orthogonalization. It consists of the signal 252 input to an encoder multiplexer 260. Also input to the Encoder Multiplexer is the Channel Quality Signal 254, the Training Symbols/Pilot Tones 256, and the Synchronization 258. The Encoder Multiplexer 260 employs the Training Symbols 256 and the Synchronization 258 to integrate guard bands, training symbols and synchronizing signals according to methods common in the art for radio frequency and microwave wireless signals. These signals, along with the pilot tones received at the receiver and other factors are used to generate the channel quality signal at the receiver. The channel quality 254 is used to provide an overall quality metric to the transmitter and is also used whenever Configuration B 197 is employed to determine the maximum transmit and receive data rate permitted for a specified level of quality of service. The output of the encoder multiplexer is M signals 262, each signal going to a forward error correcting (FEC) function 264. Here forward error correcting codes are employed. In one embodiment, those codes can be convolutional. In yet another embodiment, they can be turbo codes. Other examples of suitable codes are well known to those skilled in the art. According to this embodiment, the output of each of the M FECs is input to the M-Point IFFT 268. One example is shown for FEC 264 and output signal 266. Orthogonalization is employed in the M-Point IFFT 268 and the output 270 is input to the optical modulator 271. The output of the optical modulator 272 drives the transmit lasers and/or LEDs, 273. Column A 274 of the table shows the configuration for Configuration A. Column B 275 shows the configuration for Configuration B. Column C 276 shows the configuration for Configuration C. The transmitting elements of Configuration B 275 and Configuration C 276, each forming a station.

Figure 4B:
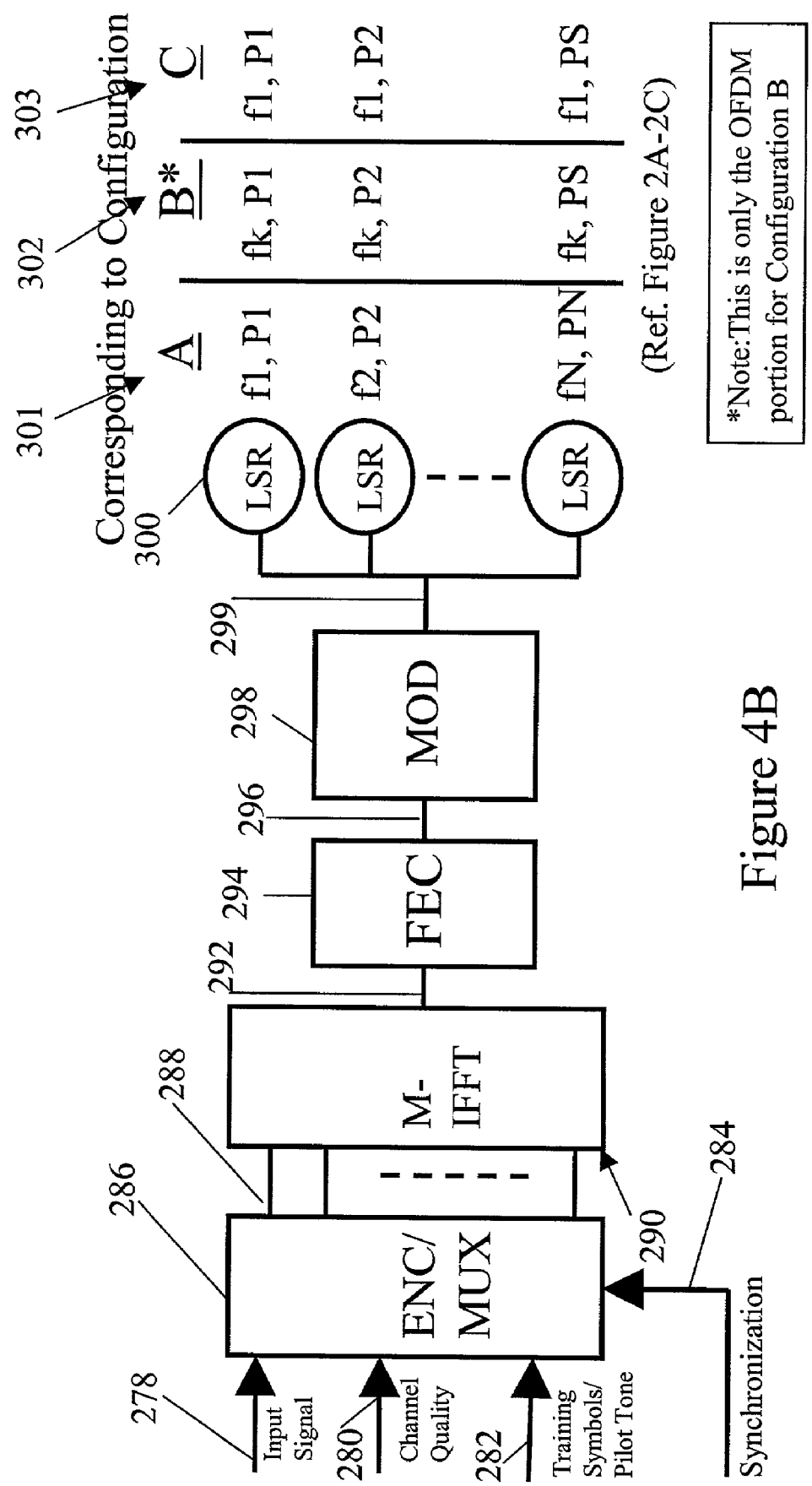
FIG. 4B illustrates an exemplary transmitter used in one aspect of the present invention where forward error correction is applied post orthogonalization.

FIG. 4B is an embodiment of the transmitter whereby FEC is applied post orthogonalization. It consists of the signal 278 input to the Encoder Multiplexer 286. Also input to the Encoder Multiplexer is the Channel Quality Signal 280, the Training Symbols/Pilot Tones 282, and the Synchronization 284. The Encoder Multiplexer 286 employs the Training Symbols 282 and the Synchronization 284 to integrate guard bands, training symbols and synchronizing signals according to methods common in the art for RF and microwave wireless signals. These signals, along with the pilot tones received at the receiver and other factors are used to generate the Channel Quality Signal at the receiver. The Channel Quality 280 is used to provide an overall quality metric to the transmitter and is also used whenever Configuration B is employed to determine maximum transmit and receive data rate permitted for a specified level of Quality of Service (QoS). The output of the encoder multiplexer is M signals 288 going to the M-Point IFFT 290. The orthogonal output of the M-Point IFFT 292 is input to the FEC function 294. Here forward error correcting codes are employed. In one embodiment, those codes can be convolutional. In yet another embodiment, they can be Turbo Codes. Other examples of suitable codes are well known to those skilled in the art. According to this embodiment, the output of the FEC 296 is input to the optical modulator 298. The output of the optical modulator 299 drives the Transmit Lasers and or LEDs, 300. Column A 301 of the table shows the configuration for Configuration A. Column B 302 shows the configuration for Configuration B. Column C 303 shows the configuration for Configuration C. The transmitting elements of Configuration B 302 and Configuration C 303, each forming a station.

Figure 4C:
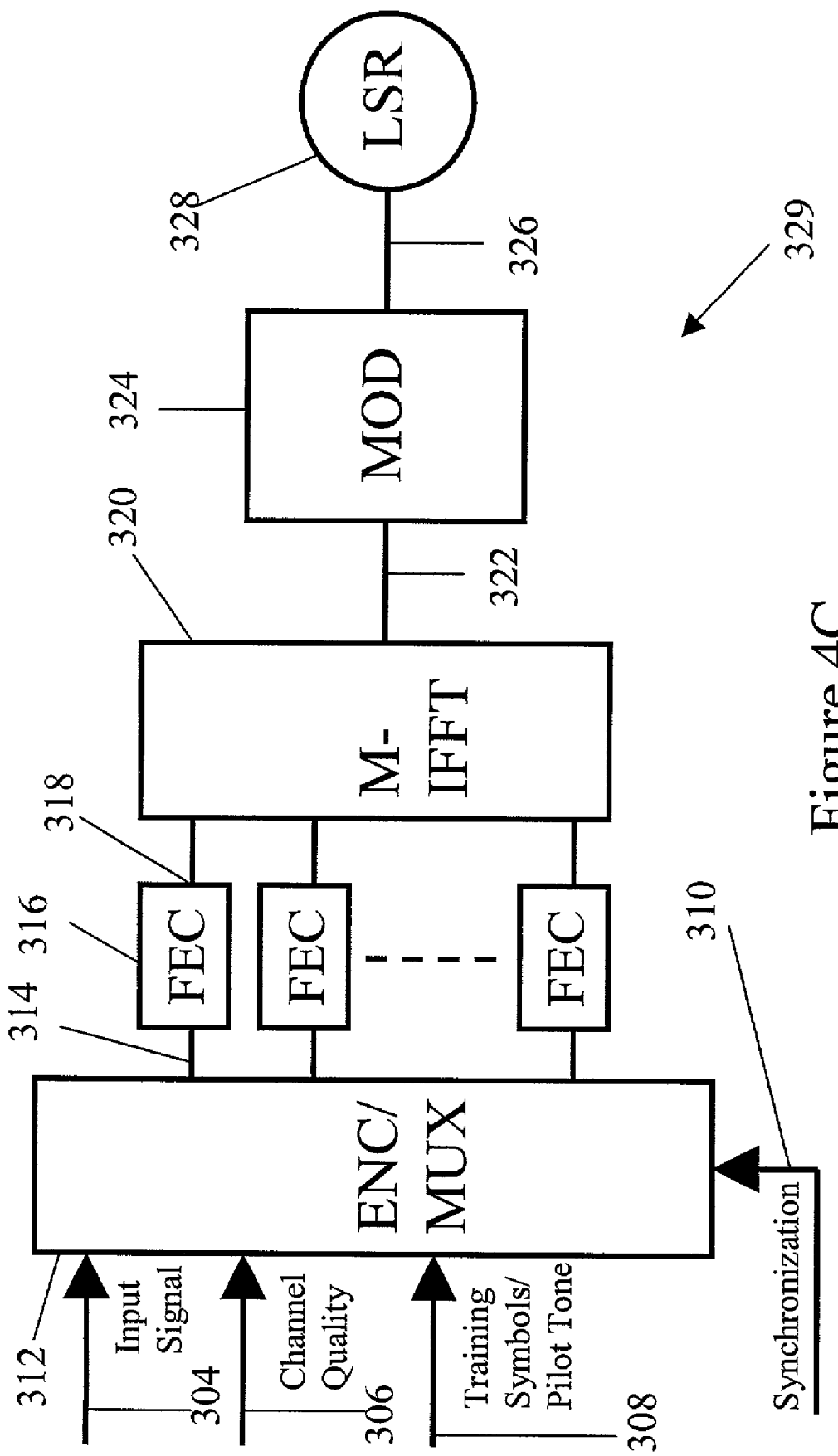
FIG. 4C illustrates an exemplary transmitter used in one aspect of the present invention where forward error correction is applied prior to orthogonalization.

FIG. 4C is an embodiment of the transmitter corresponding to Configuration D 223 whereby FEC is applied prior to orthogonalization. It consists of the signal 304 input to the Encoder Multiplexer 312. Also input to the Encoder Multiplexer is the Channel Quality Signal 306, the Training Symbols/Pilot Tones 308, and the Synchronization 310. The Encoder Multiplexer 312 employs the Training Symbols 308 and the Synchronization 310 to integrate guard bands, training symbols and synchronizing signals according to methods common in the art for RF and microwave wireless signals. These signals, along with the pilot tones received at the receiver and other factors are used to generate the Channel Quality Signal at the receiver. The Channel Quality 306 is used to provide an overall quality metric to the transmitter. The output of the encoder multiplexer is M signals 314, each going to a forward error correcting (FEC) function 316. Here forward error correcting codes are employed. In one embodiment, those codes can be convolutional. In yet another embodiment, they can be Turbo Codes. Other examples of suitable codes are well known to those skilled in the art. According to this embodiment, the output of each of the M FECs is input to the M-Point IFFT 320. One example is shown for FEC 316 and output signal 318. Orthogonalization is employed in the M-Point IFFT 320 and the output 322 is input to the optical modulator 324. The output of the optical modulator 326 drives the Transmit Laser or LED 328.

Figure 4D:
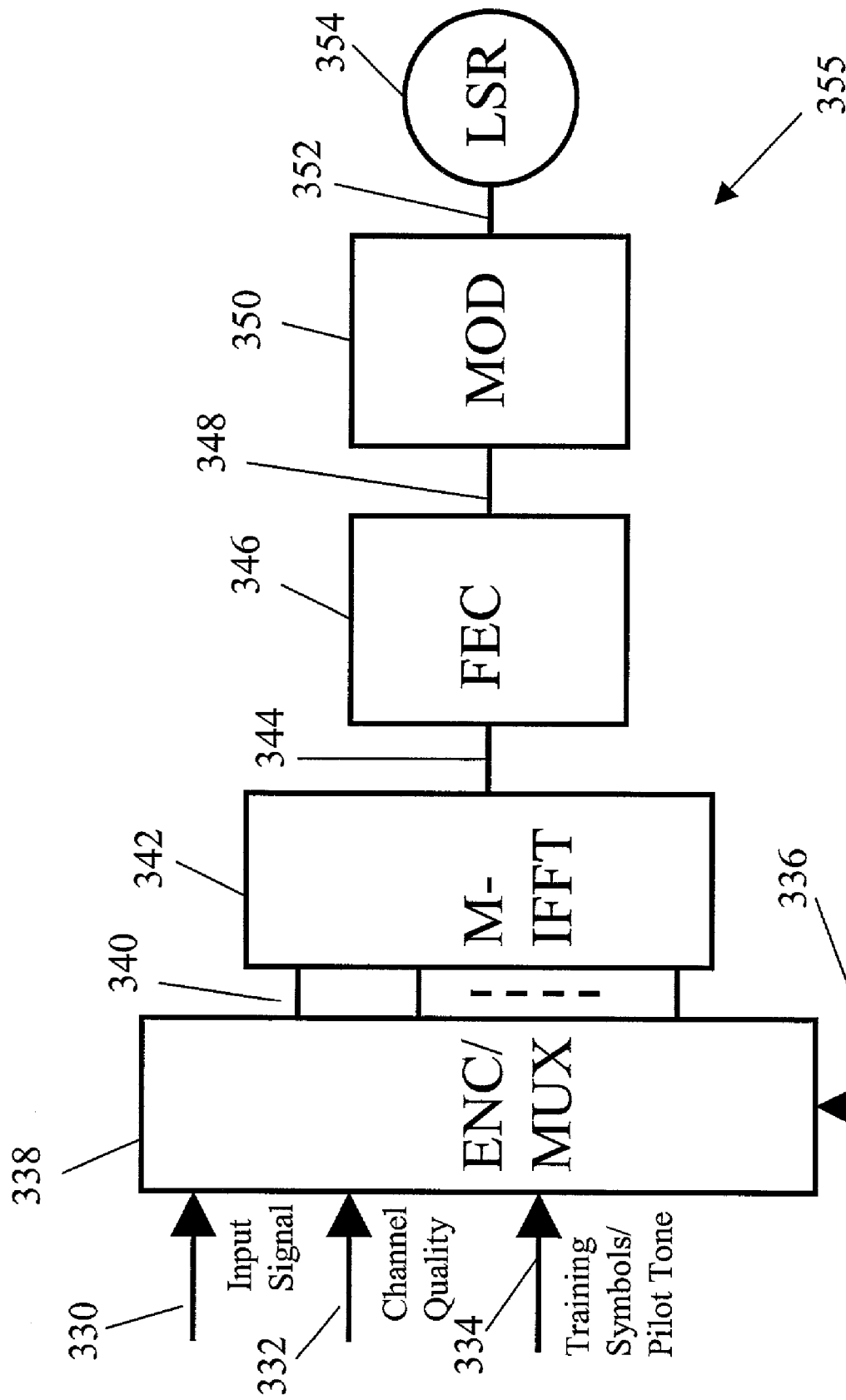
FIG. 4D illustrates an exemplary transmitter used in one aspect of the present invention where forward error correction is applied post orthogonalization.

FIG. 4D is another embodiment of the transmitter corresponding to Configuration D 223. whereby FEC is applied post orthogonalization. It consists of the signal 330 input to the Encoder Multiplexer 338. Also input to the Encoder Multiplexer is the Channel Quality Signal 332, the Training Symbols/Pilot Tones 334, and the Synchronization 336. The Encoder Multiplexer 338 employs the Training Symbols 334 and the Synchronization 336 to integrate guard bands, training symbols and synchronizing signals according to methods common in the art for RF and microwave wireless signals. These signals, along with the pilot tones received at the receiver and other factors are used to generate the Channel Quality Signal at the receiver. The Channel Quality 332 is used to provide an overall quality metric to the transmitter. The output of the encoder multiplexer is M signals 340 going to the M-Point IFFT 342. The orthogonal output of the M-Point IFFT 344 is input to the FEC function 346. Here forward error correcting codes are employed. In one embodiment, those codes can be convolutional. In yet another embodiment, they can be Turbo Codes. Other examples of suitable codes are well known to those skilled in the art. According to this embodiment, the output of the FEC 348 is input to the optical modulator 350. The output of the optical modulator 352 drives the Transmit Laser or LED 354.

FIGS. 5A–5F are block diagrams of possible deployments of a receiver according to the teachings of certain embodiments of the present invention. They correspond to the transmitter configurations of FIGS. 2 and 4.

Figure 5A:
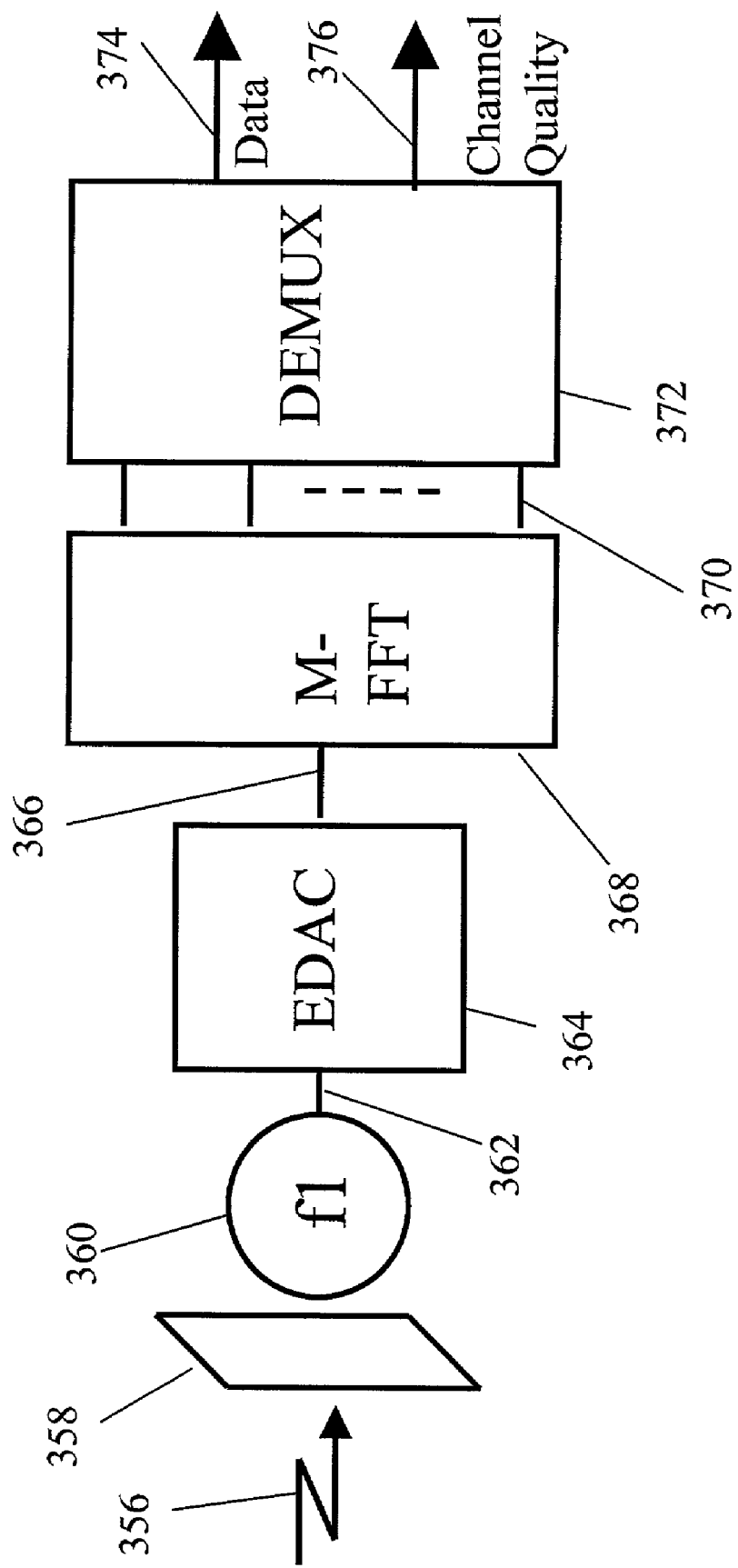
FIG. 5A illustrates an exemplary receiver used in one aspect of the present invention where forward error correction is applied in a post orthogonalization manner.
Figure 5B:
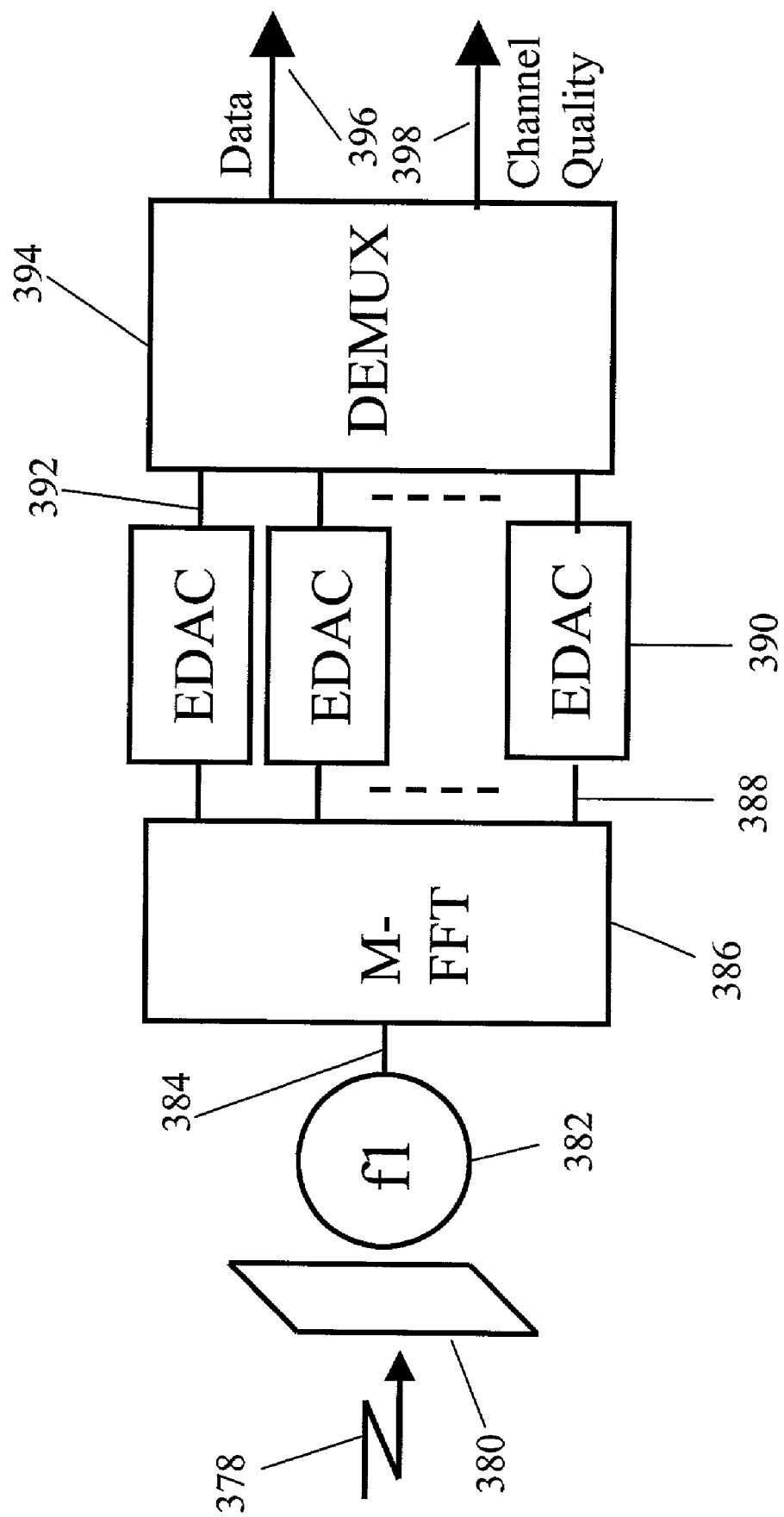
FIG. 5B is an exemplary alternative embodiment of a receiver used in one aspect of the present invention where forward error correction is applied prior to orthogonalization.

FIGS. 5A and 5B show configurations for a single carrier case. Here, an FFT is shown to illustrate one embodiment of an OFDM demodulator and is not meant to imply that this is the only way that this function can be realized. This is a decoding operation resulting in the reconstruction of the original signal. The error detection and correction (EDAC) blocks are for processing the signal and the FEC codes discussed above and generate the information necessary to repair the data stream where necessary.

The multi-carrier cases, of FIGS. 5C–5F use extensions of the same basic architecture shown in FIGS. 5A and 5B. They show individual banks of optical receivers, each with their own filters arranged in manners similar to the transmitter configuration with spatial separation.

Figure 5C:
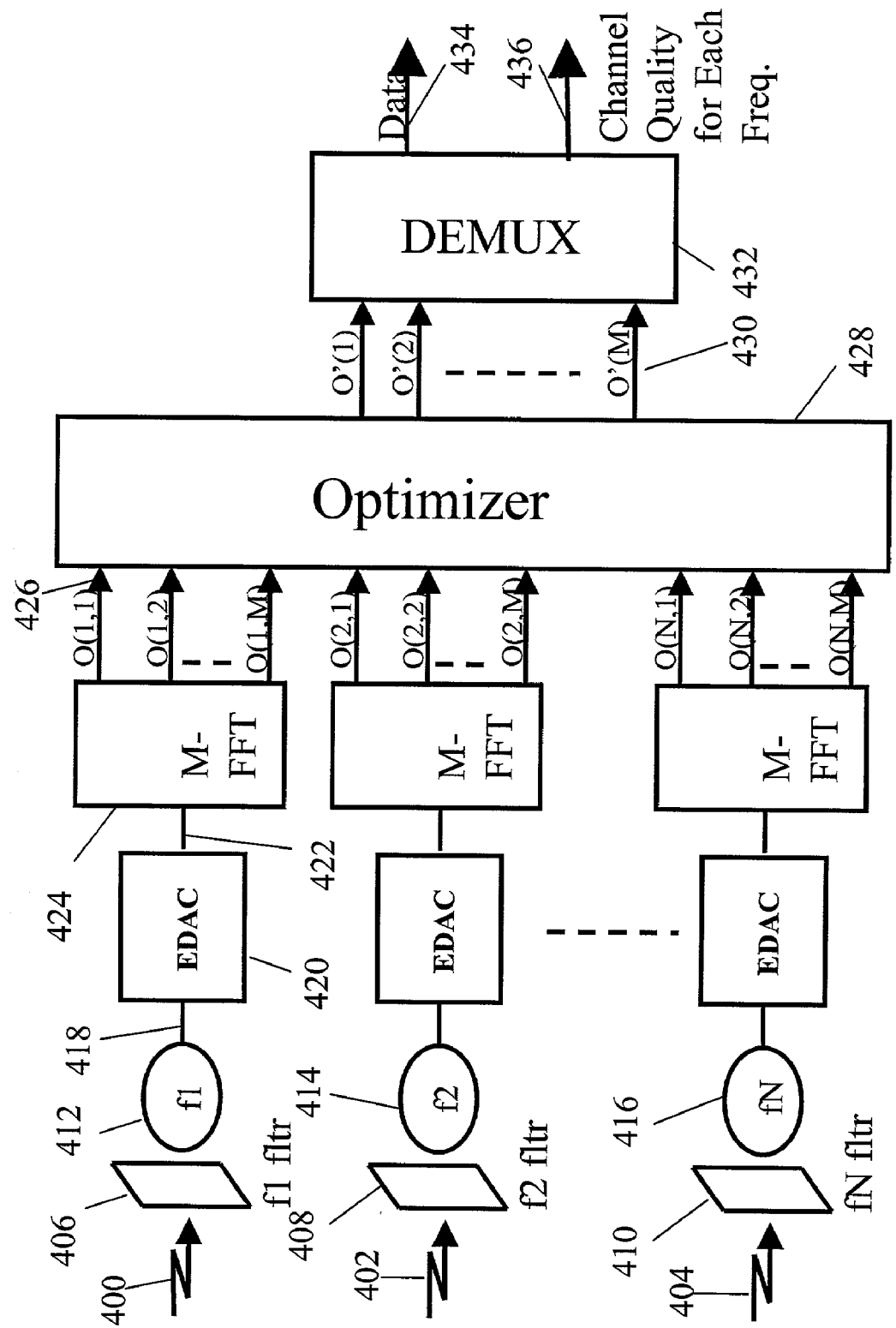
FIG. 5C illustrates an exemplary alternative embodiment of a receiver used in one aspect of the present invention where forward error correction is applied post orthogonalization and the entire message is simultaneously transmitted at N different carrier frequencies.
Figure 5D:
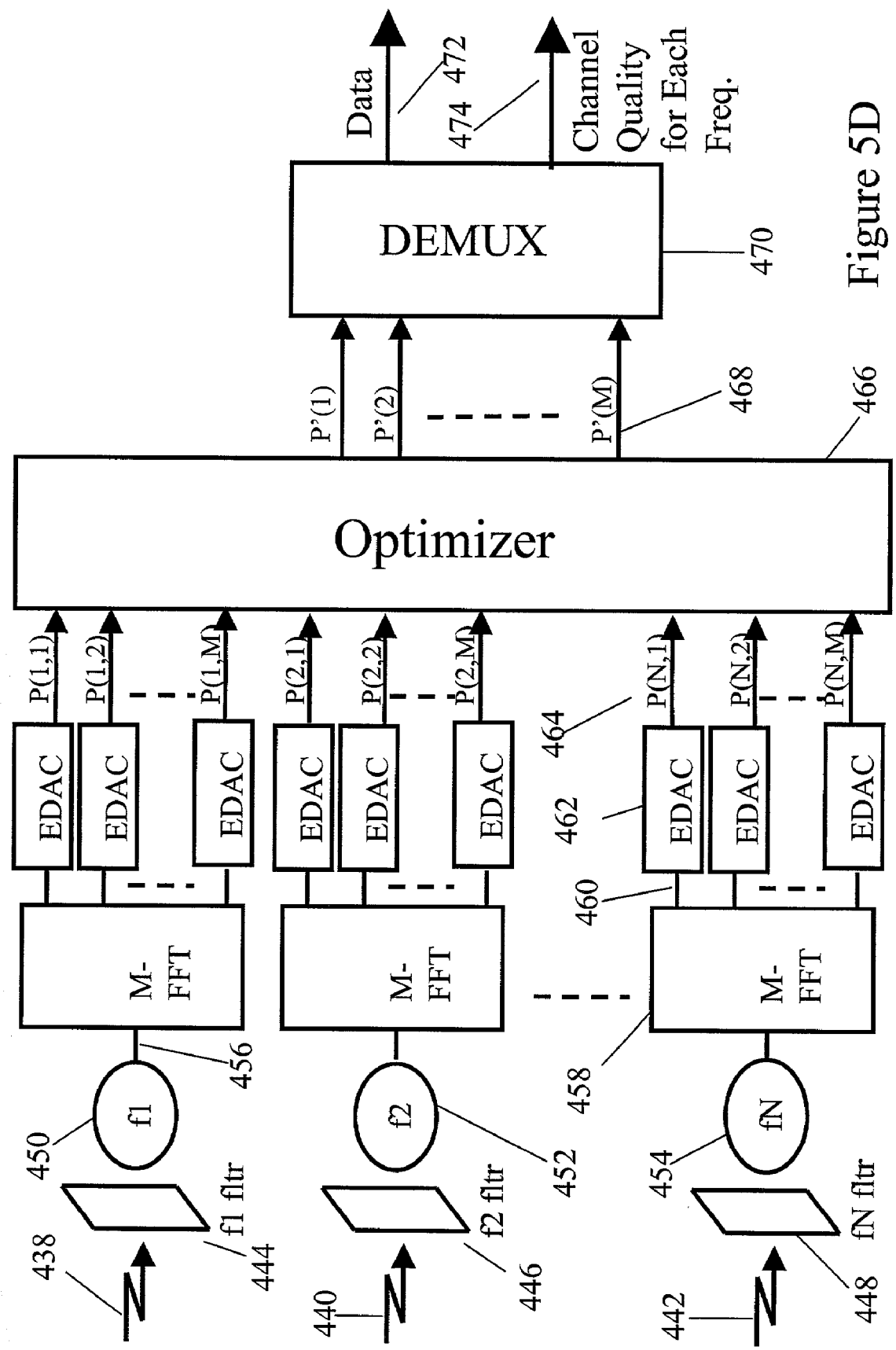
FIG. 5D illustrates an exemplary alternative embodiment of a receiver used in one aspect of the present invention where forward error correction is applied prior to orthogonalization and the entire message is capable of being simultaneously transmitted at N different carrier frequencies.

FIGS. 5C and 5D, corresponding to Configurations A, additionally show an optimizer block which chooses the best inputs to the demultiplexer (DEMUX) from among the N possible choices for each of the M inputs. This can be accomplished by noting the level of repair required in the EDAC operation.

Figure 5E:
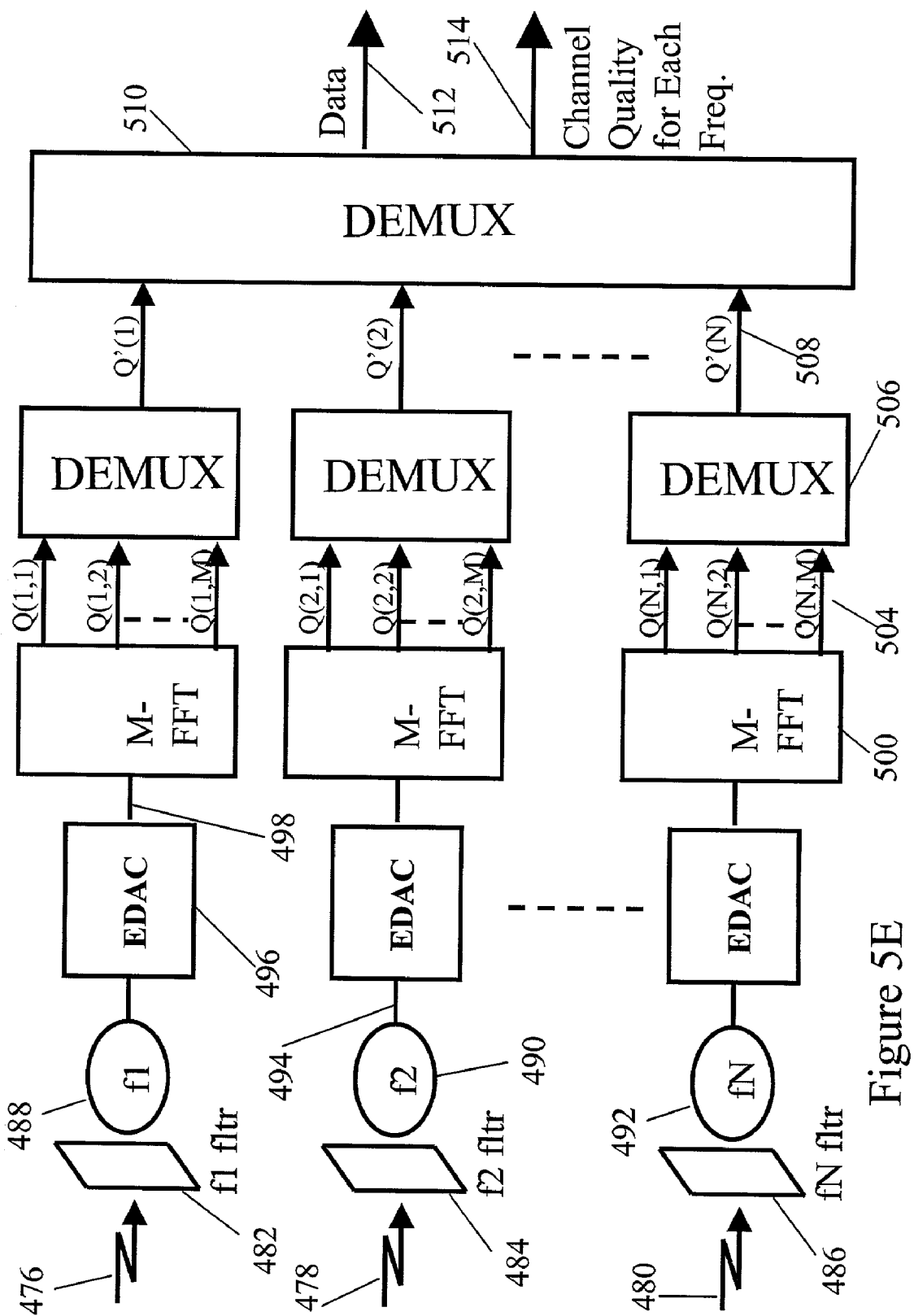
FIG. 5E illustrates an exemplary alternative embodiment of a receiver used in one aspect of the present invention where forward error correction is applied post orthogonalization and the data signal is first divided by a multiplexer into N parts so that (1/N) of the data is simultaneously transmitted at N different carrier frequencies.
Figure 5F:
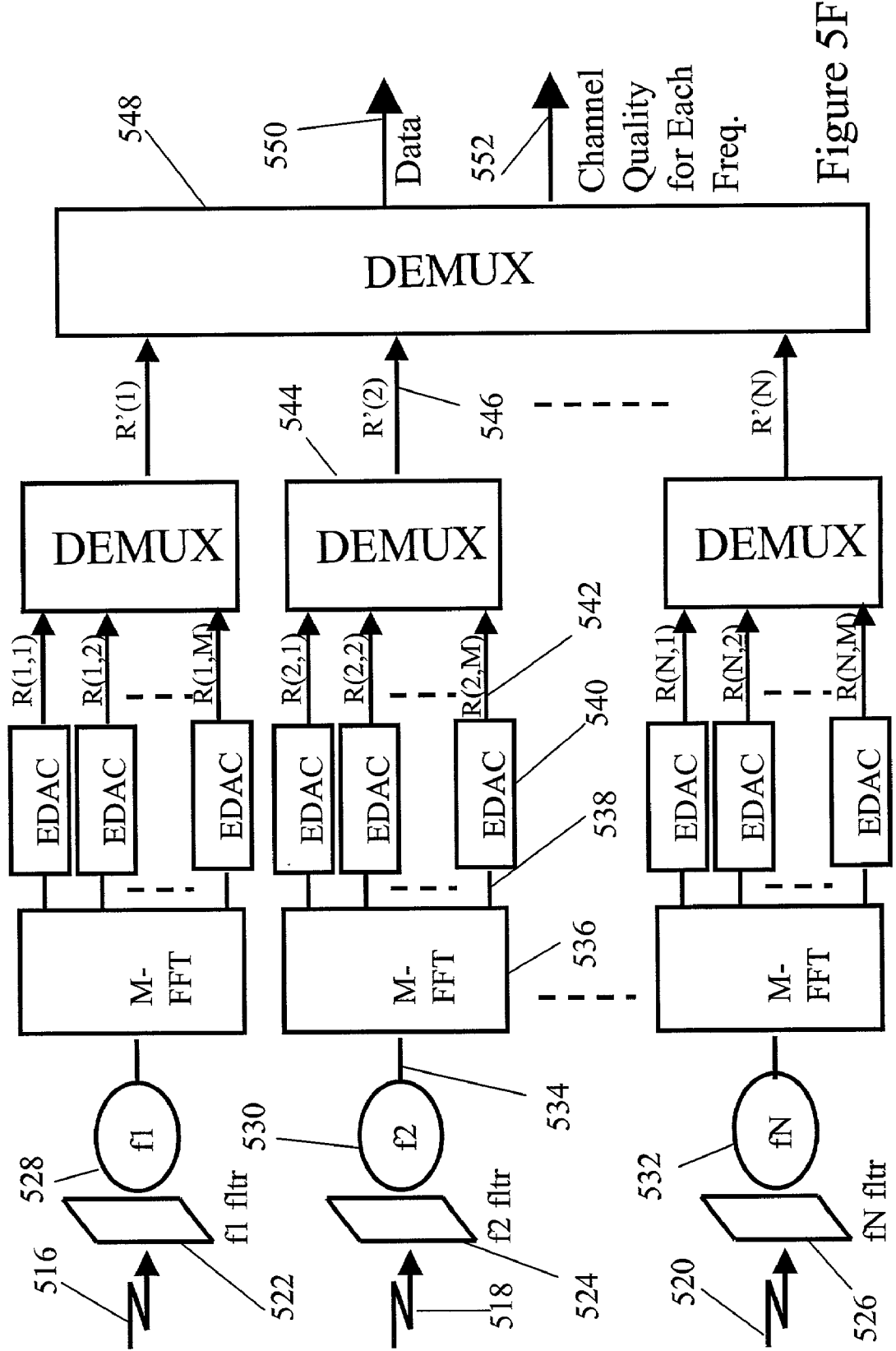
FIG. 5F illustrates an exemplary alternative embodiment of a receiver used in one aspect of the present invention where forward error correction is applied prior to orthogonalization and the data signal is first divided by a multiplexer into N parts so that (1/N) of the data is simultaneously transmitted at N different carrier frequencies.

FIGS. 5E and 5F correspond to Configuration B. Because of the initial separation of the original data stream across multiple frequencies, an additional DEMUX operation is required to reconstruct the data stream.

FIG. 5A is an embodiment of the receiver configuration to be a receiver for the single carrier transmitters of Configurations C 211 and D 223 where FEC was applied post orthogonalization 303 and 355. It consists of an input optical signal 356 at a carrier frequency of f1 passing through an optical filter 358. The optical filter is designed to pass frequency f1 and performs a bandpass filter function providing initial rejection to optical signal at other frequencies. The specific selectivity of this filter may vary depending on the level of selectivity desired and may be deleted in some cases as well. The optical signal then passes to the optical receiver 360 which is embodied here as a photodiode of sufficient sensitivity at frequency f1 so as to be able to function as an optical receiver. The output of the optical receiver 362 is input to an error detecting and correcting function (EDAC) 364 that uses the information provided by the FEC function in the corresponding transmitter to perform initial signal repair as required. The output of the EDAC 366 is input to the M-FFT decoder 368. In this embodiment, this function performs an inverse to the orthogonalizing function, the IFFT of the transmitter. In addition, in this embodiment, this function also removes the guard bands and performs frequency/frame and clock synchronization. Other embodiments can also have these functions separated. The M outputs of this M-Point FFT 370, corresponding to the M-Point IFFT of the transmitter, is input to a demultiplexer 372 where the signal is recombined in its original order with an output of data 374. Also included in the demultiplexer 372 is a channel estimator resulting in a channel quality output 376.

FIG. 5B is an embodiment of the receiver configuration to be a receiver for the single carrier transmitters of Configurations C 211 and D 223 where FEC was applied prior to orthogonalization 276 and 329. It consists of an input optical signal 378 at a carrier frequency of f1 passing through an optical filter 380. The optical filter is designed to pass frequency f1 and performs a bandpass filter function providing initial rejection to optical signal at other frequencies. The specific selectivity of this filter may vary depending on the level of selectivity desired and may be deleted in some cases as well. The optical signal then passes to the optical receiver 382 which is embodied here as a photodiode of sufficient sensitivity at frequency f1 so as to be able to function as an optical receiver. The output of the optical receiver 384 is input to the M-FFT decoder 386. In this embodiment, this function performs an inverse to the orthogonalizing function, the IFFT, of the transmitter. In addition, in this embodiment, this function also removes the guard bands and performs frequency/frame/and clock synchronizations. Other common embodiments can also have these functions separated. The M outputs 388 of this M-Point FFT 386 corresponding to the M-Point FFT of the transmitter are each input into an individual EDACs 390 that use the information provided by the FEC function in the corresponding transmitters to perform any needed signal repair. The M-outputs of the M EDACS 392 are input to a demultiplexer 394 where the signal is recombined in its original order with an output of data 396. Also included in the demultiplexer 394 is a channel estimator resulting in a channel quality output 398.

FIG. 5C is an embodiment of the receiver configuration to be a receiver for the multi-carrier transmitter of Configuration A 191 where FEC was applied post orthogonalization 301 and the entire message was simultaneously transmitted at N different carrier frequencies. It consists of input optical signals 400, 402, 404 representing N inputs at N carrier frequencies f1, f2, through fN passing through optical filters 406, 408, 410. The optical filters are designed to pass frequencies f1, f2 through fN and perform a bandpass filter function providing initial rejection to optical signals and/or interference at other frequencies. The specific selectivity of these filters may vary depending on the level of selectivity desired and may be deleted in some cases as well. The optical signals then pass to the optical receivers 412, 414, 416 which are embodied here as photodiodes and demodulators of sufficient sensitivity at frequency f1, f2, through fN so as to be able to function as optical receivers and forming a station of such elements. The outputs of each optical receiver 418 are input to an error detecting and correcting function (EDAC) 420 that uses the information provided by the FEC function from the corresponding transmitter to perform initial signal repair as required. The outputs of each EDAC 422 are each input to the corresponding M-FFT decoder 424. In this embodiment, this function performs an inverse to the orthogonalizing function, the IFFT of the transmitter. In addition, in this embodiment, this function also removes the guard bands and performs frequency/frame and clock synchronization. Other versions of this embodiment can also have these functions separated. The M outputs of each of the M-Point FFTs 426, corresponding to the MPoint IFFT of the transmitter, are input to the Optimizer 428. Note that these inputs are in the form of N vectors, each of length M: $O(1,1), O(1,2), \ldots O(1,M); O(2,1), O(2,2), \ldots O(2,M); \ldots O(N,1), O(N,2), \ldots O(N,M)$. Each set of vectors independently contains, in principle, all the information needed to reconstruct the original data set presented to the transmitter. The Optimizer individually selects from among the vector elements presented at the input to generate an output vector: $O'(1), O'(2), \ldots O'(M)$ 430. That is, the optimizer chooses among the set of vector elements $O(1,1), O(2,1), \ldots O(N,1)$ to pick the vector element with the lowest probability of corruption to become $O'(1)$. In the same manner, the optimizer selects $O'(2)$ from the set of vector elements: $O(1,2), O(2,2), \ldots O(N,2)$ and continuing until the last element $O'(M)$ is selected from the set of vector elements: $O(1,M), O(2,M), \ldots O(N,M)$. The optimizer may use Parity, Cyclic Redundancy Checking, and/or other similar means to make this judgment. This adds a significant level of robustness to the communications link by adding another degree of freedom, frequency, to the means for successfully establishing a reliable communications link. In this embodiment, should a portion of the signal, at a specific carrier frequency and time be corrupted, while in its narrowband OFDM component form, then, since that same portion of the signal will have also been transmitted at N different carrier frequencies, the probability that these N independent signals will be simultaneously corrupted at the same time will be reduced by approximately $(1/N)^{1/2}$. The output, $O'(1), O'(2), \ldots O'(M)$ is input to a demultiplexer 432 where the signal is reassembled in its original order with an output of data 434. Also included in the demultiplexer 432 is a channel estimator resulting in a channel quality output 436.

FIG. 5D is an embodiment of the receiver configuration to be a receiver for the multi-carrier transmitter of Configuration A 191 where FEC was applied prior to orthogonalization 274 and the entire message was capable of being simultaneously transmitted at N different carrier frequencies. It consists of input optical signals 438, 440, 442 representing N inputs at N carrier frequencies f1, f2, through fN passing through optical filters 444, 446, 448. The optical filters are designed to pass frequencies f1, f2 through fN and perform a bandpass filter function providing initial rejection to optical signals and/or interference at other frequencies. The specific selectivity of these filters may vary depending on the level of selectivity desired and may be deleted in some cases as well. The optical signals then pass to the optical receivers 450, 452, 454 which are embodied here as photodiodes and demodulators of sufficient sensitivity at frequency f1, f2, through fN so as to be able to function as optical receivers and forming a station of such elements. The outputs of each optical receiver 456 are each input to the corresponding M-FFT decoder 458. In this embodiment, this function performs an inverse to the orthogonalizing function, the IFFT, of the transmitter 274. In addition, in this embodiment, this function also removes the guard bands and performs frequency/frame and clock synchronization. Other versions of this embodiment can also have these functions separated. The M outputs of each of the M-Point FFTs 458, corresponding to the M-Point IFFT of the transmitter, are input to the respective EDACs 462 which use the information provided by the FEC function from the corresponding transmitter to perform initial signal repair as required. The outputs of each EDAC 464 is input to the Optimizer 466. Note that these inputs are in the form of N vectors, each of length M: $P(1,1), P(1,2), \ldots P(1,M); P(2,1), P(2,2), \ldots P(2,M); \ldots P(N,1), P(N,2), \ldots P(N,M)$. Each set of vectors independently contains, in principle, all the information needed to reconstruct the original data set presented to the transmitter. The Optimizer individually selects from among the vector elements presented at the input to generate an output vector: $P'(1), P'(2), \ldots P'(M)$ 468. That is, the optimizer chooses among the set of vector elements $P(1,1)$, $P(2,1), \ldots P(N,1)$ to pick the vector element with the lowest probability of corruption to become $P'(1)$. In the same manner, the optimizer selects $P'(2)$ from the set of vector elements: $P(1,2), P(2,2), \ldots P(N,2)$ and continuing until the last element $P'(M)$ is selected from the set of vector elements: $P(1,M), P(2,M), \ldots P(N,M)$. The optimizer may use Parity, Cyclic Redundancy Checking, and/or other similar means to make this judgment. This adds a significant level of robustness to the communications link by adding another degree of freedom, frequency, to the means for successfully establishing a reliable communications link. In this embodiment, should a portion of the signal, at a specific carrier frequency and time be corrupted while in its narrowband OFDM component form, then, since that same portion of the signal will have also been transmitted at N different carrier frequencies, the probability that these N independent signals will be simultaneously corrupted at the same time will be reduced by approximately $(1/N)^{1/2}$. The output, $P'(1)$, $P'(2), \ldots P'(M)$ is input to a demultiplexer 470 where the signal is reassembled in its original order with an output of data 472. Also included in the demultiplexer 470 is a channel estimator resulting in a channel quality output 474.

FIG. 5E is an embodiment of the receiver configuration to be a receiver for the multi-carrier transmitter of Configuration B 197 where FEC was applied post orthogonalization 302 and the data signal was first divided by a multiplexer into N pieces so that (1/N) of the data is simultaneously transmitted at N different carrier frequencies. It consists of N input optical signals 476, 478, 480 representing N inputs at N carrier frequencies f1, f2, through fN passing through optical filters 482, 484, 486. The optical filters are designed to pass frequencies f1, f2 through fN and perform a bandpass filter function providing initial rejection to optical signals and/or interference at other frequencies. The specific selectivity of these filters may vary depending on the level of selectivity desired and may be deleted in some cases as well. The optical signals then pass to the optical receivers 488, 490, 492 which are embodied here as photodiodes and demodulators of sufficient sensitivity at frequency f1, f2, through fN so as to be able to function as optical receivers and forming a station of such elements. The outputs of each optical receiver 494 are each input to an error detecting and correcting function (EDAC) 496 which uses the information provided by the FEC function from the corresponding transmitter to perform initial signal repair as required. The outputs of each EDAC 498 are each input to the corresponding M-FFT decoder 500. In this embodiment, this function performs an inverse to the orthogonalizing function, the IFFT of the transmitter. In addition, in this embodiment, this function also removes the guard bands and performs frequency/frame and clock synchronization. Other versions of this embodiment can also have these functions separated. The N outputs 504 of each of the M-Point FFTs 500, corresponding to the M-Point IFFT of the transmitter, are each input to the corresponding N Demultiplexers (DE-MUX) 504. This first demultiplexer function is necessary as the transmitter of Configuration B separated the input signal into N nominal pieces by a multiplexing operation. Note that these inputs are in the form of N vectors, each of length M: $Q(1,1), Q(1,2), \ldots Q(1,M); Q(2,1), Q(2,2), \ldots Q(2,M); \ldots Q(N,1), Q(N,2), \ldots Q(N,M)$. Each set of vectors independently contains a unique (1/N) portion of the total original message sent by the transmitter. Each DEMUX properly orders the data stream and inputs N outputs $Q'(1), Q'(2), Q'(M)$ 508 to the second stage DEMUX 510 where the signal is reassembled in its original order as an output of Data 512. Also included as a DEMUX output is a channel estimator resulting in a Channel Quality for Each Freq output 514 which may be unique to each of the N frequencies transmitted so that other than a simple (1/N) division of the data across all transmitted frequencies can be affected.

For example, if the transmittance at a particular frequency and at a particular time is poor, then by means of the Channel Quality signal 514, that frequency can be dynamically de-emphasized, or even eliminated in real time from the set of frequencies used to transmit the signal. This quality signal can be dynamically monitored and decisions made as to the optimum set of frequencies to be used for data transmission can be constantly updated. This adds to system robustness by only using those frequencies at any instant in time at which adequate transmittance occurs. Since the instantaneous transmittance characteristics as a function of frequency can vary considerably, this is similar to adding another degree of diversity to the system.

FIG. 5F is an embodiment of the receiver configuration to be a receiver for the multi-carrier transmitter of Configuration B 197 where FEC was applied prior to orthogonalization 275 and the data signal was first divided by a multiplexer into N pieces so that (1/N) of the data is simultaneously transmitted at N different carrier frequencies. It consists of N input optical signals 516, 518, 520 representing N inputs at N carrier frequencies f1, f2, through fN passing through optical filters 522, 524, 526. The optical filters are designed to pass frequencies f1, f2 through fN and perform a bandpass filter function providing initial rejection to optical signals and/or interference at other frequencies. The specific selectivity of these filters may vary depending on the level of selectivity desired and may be deleted in some cases as well. The optical signals then pass to the optical receivers 528, 530, 532 which are embodied here as photodiodes and demodulators of sufficient sensitivity at frequency f1, f2, through fN so as to be able to function as optical receivers and forming a station of such elements. The outputs of each optical receiver 534 are each input to the corresponding "N" M-FFT decoders 536. In this embodiment, this function performs an inverse to the orthogonalizing function, the IFFT, of the transmitter. In addition, in this embodiment, this function also removes the guard bands and performs frequency/frame and clock synchronization. Other versions of this embodiment can also have these functions separated. The M outputs 538 of each of the "N" M-Point FFTs 536, corresponding to the "N" M-Point IFFTs of the transmitter, are input to the respective (N×M) EDACs 540 which use the information provided by the FEC function from the corresponding transmitter to perform initial signal repair as required. The outputs of each of the (N×M) EDACs 542 are input to the N Demultiplexers (DEMUX) 544. This first demultiplexer function is necessary as the transmitter of Configuration B separated the input signal into N pieces by a multiplexing operation. Note that these inputs are in the form of N vectors, each of length M: R(1,1), R(1,2), ... R(1,M); R(2,1), R(2,2), ... R(2,M); ... R(N,1), R(N,2), ... R(N,M). Each set of vectors independently contains a unique (1/N) portion of the total original message sent by the transmitter. Each DEMUX properly orders the data stream and inputs N outputs R'(1), R'(2), ... R'(M) 546 to the second stage DEMUX 548 where the signal is reassembled in its original order as an output of Data 550. Also included as a DEMUX output is a channel estimator resulting in a Channel Quality for Each Freq output 552 which may be unique to each of the N frequencies transmitted so that other than a simple (1/N) division of the data across all transmitted frequencies can be affected.

For example, if the transmittance at a particular frequency and at a particular time is poor, then by means of the Channel Quality signal 552, that frequency can be dynamically de-emphasized, or even eliminated from the set of frequencies used to transmit the signal. This quality signal can be dynamically monitored and decisions made as to the optimum set of frequencies to be used for data transmission can be constantly updated. This adds to system robustness by only using those frequencies at any instant in time at which adequate transmittance occurs. Since the instantaneous transmittance characteristics as a function of frequency can vary considerably, this is similar to adding another degree of diversity to the system.

Yet another degree of freedom not shown here can be accomplished by different polarizations. These have a similar effect as in spatial diversity and the benefits of the two are typically not cumulative.

The systems described here are applicable for outdoor and indoor applications. For outdoor applications, the channel is more likely to be affected by environmental considerations while for indoor applications, the environment is better behaved, but the presence of multipath and glint, due to being indoors, similarly render the channels to be hostile.

This invention is compatible with Wave Division Multiplex (WDM) and Dense Wave Division Multiplex (DWDM) architectures and further embodiments of it can be made by such combinations of this invention with them.

Although the present invention and its advantages have been described in detail, it should be understood that various changes, substitutions, and alterations can be made therein without departing from the spirit and scope of the present invention as defined by the appended claims.

What is claimed is:

1. A method for transmitting data between a first station and a second station in an optical network, the method comprising:
   receiving an input signal representing the data,
   demultiplexing the input signal into two or more portions,
   preparing the input signal to be less susceptible to errors caused by atmospheric variances during transmission through the atmosphere by performing an inverse fast Fourier transform on the two or more portions to create an orthogonal representation of the input signal, and
   modulating at least one laser diode, using the orthogonal representation, such that modulated data can be transmitted on an atmospheric optical carrier between the first station and the second station.

2. The method of claim 1, further comprising receiving at least one additional input signals representing encoding information.

3. The method of claim 2, wherein the encoding information is selected from the group consisting of channel quality information, training symbol information, pilot tones, and synchronization information.

4. The method of claim 2, wherein the performing step further comprises performing the fast Fourier transform using the encoding information and the input signal.

5. The method of claim 2 further comprising generating forward error correction codes.

6. The method of claim 5, further comprising adding the forward error correcting codes to the two or more portions.

7. The method of claim 5, further comprising adding the forward error correcting codes to the orthogonal representation.

8. The method of claim 5, wherein the performing step further comprises performing the fast Fourier transform using the encoding information, forward error correcting codes, and the input signal.

9. The method of claim 1 further comprising modulating additional laser diodes such that the modulated data can be transmitted on additional optical carriers using at least one frequency.

10. The method of claim 1 further comprising modulating additional laser diodes such that the modulated data can be transmitted on additional optical carriers using different frequencies.

11. The method of claim 1 further comprising modulating at least one other laser diode to provide spatial diversity in the transmission of the modulated data between the first station and the second station.

12. A method for transmitting data between a first station and a second station in an optical network, the method comprising:
   receiving an input signal representing the data,
   demultiplexing the input signal into two or more portions,
   performing an inverse fast Fourier transform on the two or more portions to create an orthogonal representation of the input signal,
   modulating at least one laser diode, using the orthogonal representation, such that modulated data can be transmitted on an optical carrier between the first station and the second station, and
   distributing the modulated data across two or more optical carriers that are each transmitted by a respective said laser diode and that travel from the first station to the second station along respective different optical paths, wherein each optical carrier receives a predetermined portion of the modulated data.

13. The method of claim 12 including selecting respective different frequencies for each of the two or more optical carriers.

14. A method for transmitting data between a first station and a second station in an optical network the method comprising:
   receiving an input signal representing the data,
   demultiplexing the input signal into two or more portions, performing an inverse fast Fourier transform on the two or more portions to create an orthogonal representation of the input signal, modulating at least one laser diode, using the orthogonal representation, such that modulated data can be transmitted on an optical carrier between the first station and the second station, and distributing the modulated data across two or more optical carriers that are each transmitted by a respective said laser diode and that travel from the first station to the second station along respective different optical paths, wherein an amount of modulated data to be carried by each carrier is dynamically allocated.

15. The method of claim 14 further comprising determining the amount of modulated data to be carried on the two or more optical carriers, wherein the determining is made by determining a channel quality of each optical carrier of the two or more optical carriers.

16. A method for transmitting data between a first station and a second station in an optical network, the method comprising:

receiving an optical input signal containing the data from an atmospheric optical carrier, filtering the optical input signal to filter extraneous frequencies to create a filtered signal, detecting errors in the filter signal, correcting errors in the filtered signal to create a corrected signal, performing a fast Fourier transform on the corrected signal to create two or more portions, and multiplexing the two or more portions to extract the data, wherein the multiplexing includes extracting a channel quality estimate that accounts for atmospheric variances affecting the atmospheric optical carrier.

17. A method for transmitting data between a first station and a second station in an optical network, the method comprising:

receiving an optical input signal containing the data from an atmospheric optical carrier, filtering the optical input signal to filter extraneous frequencies to create a filtered signal, performing a fast Fourier transform on the corrected signal to create two or more portions, detecting errors in the two or more portions caused by atmospheric variances affecting the atmospheric optical carrier, correcting errors in the two or more portions to create a plurality of corrected signals, and multiplexing the plurality of corrected signals to extract the data.

18. The method of claim 17 wherein the multiplexing step further comprises extracting an estimate of the channel quality.

19. A system for transmitting data using line-of-sight optical carriers, the system comprising:

a first station having at least first and second laser diodes, wherein the first station includes:

means for receiving an input signal representing the data, means for demultiplexing the input signal into two or more portions, means for preparing the input signal for transmission through the atmosphere, wherein the means for preparing includes means for performing an inverse fast Fourier transform on the two or more portions to create an orthogonal representation of the input signal, and means for modulating the at least first and second laser diodes, using the orthogonal representation, such that modulated data is transmitted using spatial diversity on the optical carriers between the first station and the second station, and a second station having at least a receiver, wherein the second station is linked to the first station via at least the optical carriers, and wherein the second nation is configured to receive the modulated data transmitted by the first station via the optical carriers.

20. The system of claim 19 wherein the second station further includes:

means for filtering the received modulated data to filter extraneous frequencies to create a filtered signal, means for detecting errors in the filter signal caused by atmospheric variances affecting the optical carriers, means for correcting errors in the filtered signal to create a corrected signal, means for performing a fast Fourier transform on the corrected signal to create two or more portions, and means for multiplexing the two or more portions to extract the data, wherein the multiplexing includes extracting a channel quality estimate that accounts for atmospheric variances affecting the optical carriers.

* * * * *